(12) United States Patent
Toyoda

(10) Patent No.: US 6,335,966 B1
(45) Date of Patent: Jan. 1, 2002

(54) IMAGE COMMUNICATION APPARATUS SERVER APPARATUS AND CAPABILITY EXCHANGING METHOD

(75) Inventor: Kiyoshi Toyoda, Kunitachi (JP)

(73) Assignee: Matsushita Graphic Communication Systems, Inc., Tokyo (JP)

(*) Notice: Subject to any disclaimer, the term of this patent is extended or adjusted under 35 U.S.C. 154(b) by 0 days.

(21) Appl. No.: 09/388,198

(22) Filed: Sep. 1, 1999

(30) Foreign Application Priority Data

Mar. 29, 1999 (JP) .......................... 11-087214

(51) Int. Cl.[7] .......................................... H04M 11/00
(52) U.S. Cl. .................... 379/100.06; 379/100.01; 358/442
(58) Field of Search ................. 379/100.16, 93.24, 379/93.15, 100.01, 100.02, 100.13, 100.17, 100.12, 100.08; 358/402, 403, 434, 442, 468

(56) References Cited

U.S. PATENT DOCUMENTS

| 5,872,845 | A | * | 2/1999 | Feder ................... 379/100.13 |
| 5,881,233 | A | | 3/1999 | Toyoda et al. |
| 6,119,234 | A | * | 9/2000 | Aziz et al. ................... 713/201 |
| 6,266,160 | B1 | * | 7/2001 | Sato et al. ................... 358/407 |

FOREIGN PATENT DOCUMENTS

| JP | 353211940 A | * | 9/1988 | ........... H04L/11/20 |
| JP | 402146851 A | * | 6/1990 | ............ H04M/1/57 |
| JP | 410200519 A | * | 7/1998 | ............. H04L/9/08 |
| JP | 410304173 A | * | 11/1998 | ............ H04N/1/32 |
| JP | 10334007 | | 12/1998 | |
| JP | 11205378 | | 7/1999 | |

OTHER PUBLICATIONS

Reasons for the Rejection issued Nov. 21, 2000.
English Language Abstract of JP–11–205378.
English language abstract of JP 10–334007.
Network Working Group Request For Comments: 2305 Category: Standards Track, entitle "A Simple Mode Of Facsimile Using Internet Mail", published in Mar. 1998, by K. Toyoda et al..

* cited by examiner

Primary Examiner—Binh Tieu
Assistant Examiner—Melur Ramakrishnaiah
(74) Attorney, Agent, or Firm—Greenblum & Bernstein, P.L.C.

(57) ABSTRACT

An Internet facsimile apparatus makes inquiry about capability, which a destination possesses, to a local server. The server is connected to the same LAN as that of the Internet facsimile apparatus. When the local server has no capability information of the destination, the Internet facsimile apparatus makes inquiry to a DNS server and obtains capability information. Then, the Internet facsimile apparatus makes an image to be suitable for the capability of the destination and transmits it to the destination via the Internet. As a result, the Internet facsimile apparatus on a transmitter side can surely obtain capability information of a destination terminal, thereby making it possible to carry out the same capability exchange as that of G3 facsimile apparatus.

15 Claims, 22 Drawing Sheets

DESTINATION INFORMATION TABLE

| ONE-TOUCH DIALING KEY | TELEPHONE NUMBER | MAIL ADDRESS |
|---|---|---|
| 0 1 | 03-XXX-0000 | XX@OO.CO.jp |
| 0 2 | | △△@XX.CO.jp |
| 0 3 | 04-△△-0000 | |

FIG. 4

CAPABILITY EXCHANGE TABLE (SERVER)

| TELEPHONE NUMBER | MAIL ADDRESS | NAME OF KIND OF APPARATUS |
|---|---|---|
| 03-XXX-0000 | XXX@OO.co.jp | XXXX |
|  | OO@XX.co.jp | XOOO |
| ⋮ | ⋮ | ⋮ |

KIND OF APPARATUS = XXXX

| CAPABILITY ITEMS | CAPABILITY CONTENT |
|---|---|
| RESOLUTION | ..... |
| PAPER SIZE | A4, A3 |
| COMPRESSION FORMAT | ..... |
| ENCRYPTION FORMAT | IMPOSSIBLE |
| COLOR | IMPOSSIBLE |
| OTHER | NON |

FIG. 5

DOMAIN NAME : abc.co.jp

| NAME | DATA CLASS | RECORD TYPE | DATA |
|---|---|---|---|
| abc.co.jp | IN | MX | mail.gate |
| mail-gate | IN | A | 123.2.0.20 |
| ifax1 | IN | FX | KIND OF APPARATUS1<br>A4, color, JBIG, S/MIME, · · · |
| ifax2 | IN | FX | KIND OF APPARATUS2<br>B4, B/W, MR, PGP/MIME, · · · |
| . . | . . | . . | . . |

FIG. 6

DESTINATION INFORMATION TABLE

| ONE-TOUCH DIALING KEY | TELEPHONE NUMBER | MAIL ADDRESS | NAME OF KIND OF APPARATUS |
|---|---|---|---|
| 0 1 | 03-XXX-0000 | XXX@OO.CO.jp | X X X X |
| 0 2 | | △△@XX.CO.jp | O O O X |
| | | OOO@XX.CO.jp | X X O O |
| | | | |

FIG. 19

CAPABILITY TABLE

| NAME OF KIND OF APPARATUS | REGISTRATION CAPABILITY | |
|---|---|---|
| X X X X | CAPABILITY ITEMS | CAPABILITY CONTENT |
| | RESOLUTION | · · · · · |
| | PAPER SIZE | A 4, A 3 |
| | COMPRESSION FORMAT | · · · · · |
| | ENCRYPTION FORMAT | IMPOSSIBLE |
| | COLOR | IMPOSSIBLE |
| X O O O | | |

FIG. 20

IMAGE COMMUNICATION APPARATUS SERVER APPARATUS AND CAPABILITY EXCHANGING METHOD

BACKGROUND OF THE INVENTION

1. Field of the Invention

The present invention relates to an image communication apparatus, a server apparatus, and a capability exchanging method.

2. Description of the Related Art

In conventional facsimile apparatuses, a G3 facsimile apparatus, which carries out data communications using an analog network, and a G4 facsimile apparatus, which carries out data communications using a digital network such as ISDN, etc., are generally used. Such facsimile apparatuses using the analog network and the digital network (hereinafter referred to as "public switched telephone network (PSTN)" in a word) are hereinafter called G3/G4 FAX. On the other hand, an Internet facsimile apparatus (hereinafter referred to as "IFAX"), that receives and transmits data over an Internet protocol, has been developed in recent years. Particularly, standardization of an e-mail type IFAX, which receives and transmits image data using an e-mail transfer protocol, has been developed in IETF (Internet Engineering Task Force) and ITU (International Telecommunication Union).

The following will explain the case using SMTP (simple mail transfer protocol) and POP (Post Office Protocol) 3 as a mail transfer protocol in transmitting data by an e-mail type IFAX.

IFAX transmits a mail to a SMTP server. The SMTP server transfers the mail to a POP3 server to which a receiver belongs. The POP3 server stores the mail in a mail box of a destination.

Since data communications by IFAX is non-synchronously carried out, capability exchange cannot be executed between IFAX and a communication terminal on the destination. For this reason, IFAX is intended to surely carry out communications by executing communications using a minimum function of a transmitter(sender) and the destination(receiver). As described in a document RFC2305 "A Simple Mode of Facsimile Using Internet mail" (K. Toyoda et. al; March 1998) issued by IETF, the minimum function, which IFAX should possess, is defined as a "simple mode".

More specifically, the communication protocol is SMTP, and corresponds to MIME and a minimum set of a TIFF file.

The minimum set is defined in the above RFC2305. In the TIFF file, there are five sets such as S, F, J, L, and M, depending on a facsimile mode and a profile supporting the TIF file. Among these sets, the lowest one is the profile S, that is, the minimum set.

More specifically, the following points can be defined.

The minimum set supports a monochrome image.

A compression format is a MH (Modified Huffman coding);

A CPU is an Intel system;

A width of paper is 1728 (corresponding to A4 size);

Resolution is 100 dpi or 200 dpi; and

A data list is LSB.

However, in communications using the simple mode, only the minimum function can be used. For this reason, even if both a transmitter terminal and a destination terminal have the function more than the simple mode, communications is carried out using the minimum function.

To solve such a problem, there is considered a communication system in which capability information of destination terminals is registered in a server in advance such that the sender terminal can obtain capability information of the destination terminals from the server. For example, in the Unexamined Patent Publication No. Hei 10-334007 (corresponding to U.S. patent application Ser. No. 09/084,938 filed on May 28, 1998), such a communication system is disclosed. According to IFAX described in the above publication, since capability information of the destination terminals can be obtained before transmission is started, communications suitable for the capability of the destination terminals can be carried out.

However, since it is actually difficult to register capability information of all terminals existing on the Internet to one server, capability information of only the limited terminals is registered to the server. For this reason, when capability information of the destination terminal is not registered in the sever, there is nothing other than the way in which the function is reduced to the minimum function and communications is carried out in a simple mode.

SUMMARY OF THE INVENTION

An object of the present invention is that capability information of a destination terminal can be surely obtained by a terminal on a transmitter side, and that the same capability exchange as that of G3 facsimile apparatus can be carried out by an Internet facsimile apparatus.

When an image communication apparatus of the present invention requests capability information of a destination terminal from a first server and no capability information of the destination terminal is registered in the first server, the image communication apparatus requests capability information from a second server having capability information of a network terminal registered in advance or a server group directly or via the first server.

According to the present invention, even if no capability information of the destination terminal is registered in the first server, capability information is requested from the second server having capability information of the network terminal registered in advance or the server group. As a result, capability information of the destination terminal can be surely obtained and communications suitable for the capability of the destination terminal can be carried out.

The above object can be achieved by an image communication apparatus having capability obtaining means for making inquiry to the other server so as to obtain capability information in accordance with the other server when inquiry about capability which a destination possesses is made to one server and the one server has no capability information of the destination; and a data transmitting section for making an image to be suitable for the capability of the destination so as to transmit the image to the destination via the Internet.

Also, the above object can be achieved by an image communication apparatus having first obtaining means for obtaining destination information of a communication counterpart from a first table storing destination information including addresses of a plurality of communication apparatuses and their capability information; second obtaining means for obtaining destination information of the communication counterpart from a second table storing the same information as that of the first table and being capable of obtaining capability information for a shorter period of time than the first obtaining means; control means for operating the first obtaining means when no desired destination information can be obtained by operating the second obtaining means; data processing means for executing processing for converting image data to a format adjusting to capability of the destination; and a data transmitting section for sending transmitting data including the converted image data to the destination via the Internet.

Moreover, the above object can be achieved by a server apparatus having a capability information storing section for storing at least one of a mail address of an image communication apparatus and a telephone number in association with capability; and a capability information providing section for providing capability information in accordance with inquiry from the image communication apparatus.

Further, the above object can be achieved by a capability exchange system wherein capability information of a communication apparatus on the Internet is spread and managed by a plurality of server apparatuses scattered on the Internet, and capability information is sent in response to inquiry about capability sent from the communication apparatus using a mail address by a cooperative operation of the plurality of server apparatuses.

Furthermore, the above object can be achieved by a capability exchange method for making inquiry to the other server so as to obtain capability information in accordance with the other server when inquiry about capability which a destination possesses is made to one server and the one server has no capability information of the destination.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 4 is a structural view of a destination information table according to the first embodiment of the present invention;

FIG. 5 is a structural view of a capability exchange table according to the first embodiment of the present invention;

FIG. 6 is a structural view of a zone information table according to the first embodiment of the present invention;

FIG. 19 is a structural view of a destination information table according to the fifth embodiment of the present invention;

FIG. 20 is a structural view of a capability exchange table according to the fifth embodiment of the present invention;

DETAILED DESCRIPTION OF THE PREFERRED EMBODIMENTS

Embodiments of the present invention will now be specifically described with reference to the accompanying drawings.

(First Embodiment)

Figure 1:
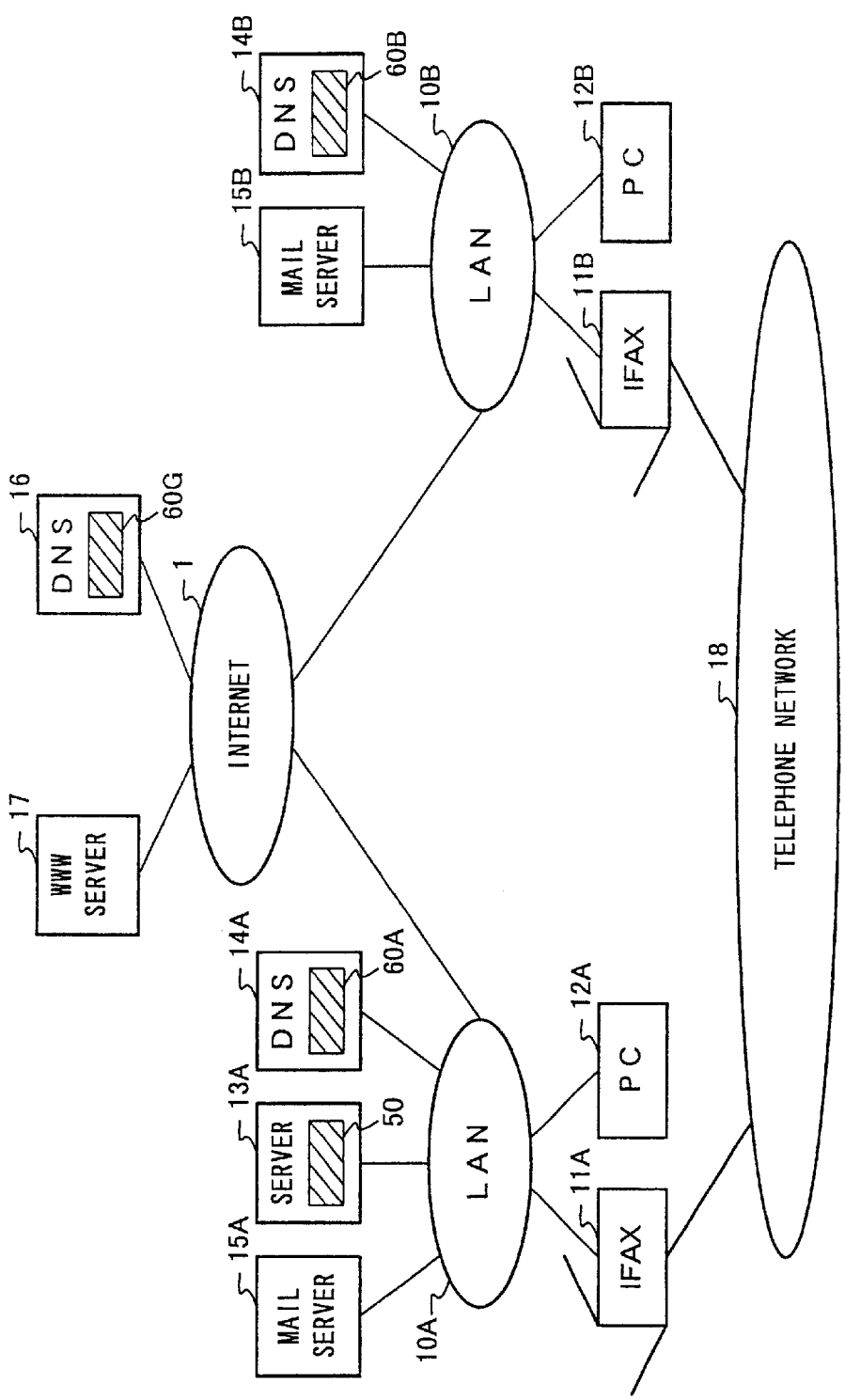
FIG. 1 is a view showing a system structure of a communication system according to a first embodiment of the present invention.

FIG. 1 shows a network structure of a communication system according to a first embodiment. In this figure, there is shown a state in which a first LAN 10A and a second LAN 10B are communicably connected to each other via the Internet 1.

A plurality of network terminals including an IFAX 11A and a personal computer 12A is connected onto the first LAN 10A. The network terminal is a communication apparatus that conducts communications in accordance with a communication protocol communicable on the Internet 1.

Moreover, a server 13A, a domain name system (hereinafter referred to as "DNS") server 14A, and a mail server 15A are arranged onto the first LAN 10A. The server 13A provides capability information of a destination terminal to the IFAX 11A. The DNS server 14A is a name server, which manages a domain name of IFAX 11A, and capability information of the network terminals existing in a zone (first LAN 10A in this embodiment) is registered therein. The mail server 15A has a mail box of network terminals existing in the first LAN 10A on one hand, and a function of transferring an e-mail transmitted from these network terminals to the mail server having a mail box of a destination terminal on the other hand.

An IFAX 11B, a terminal 12B, a DNS server 14B, a mail server 15B, etc., are connected onto the second LAN 10B. The DNS server 14B is a name server, which manages a domain name of IFAX 11B, and capability information of the network terminals existing in a zone (second LAN 10B in this embodiment) is registered therein. The mail server 15B has a mail box of network terminals existing in the first LAN 10B on one hand, and transfers an e-mail transmitted from these network terminals to the mail server having a mail box of a destination terminal on the other hand.

A high DNS server 16, a WWW server 17, etc., are arranged on the Internet 1. The high DNS server 16 is a name server that manages a domain name of a high position of a hierarchical structure, i.e., tree structure) in which domain manes are hierarchically arranged like a tree. A domain name of a low hierarchy that DNS servers 14A, 14B manage is provided under the domain name of the high hierarchy that the high DNS server 16 manages. The WWW server 17 registers a transmitting image in a case described later.

Figure 2:
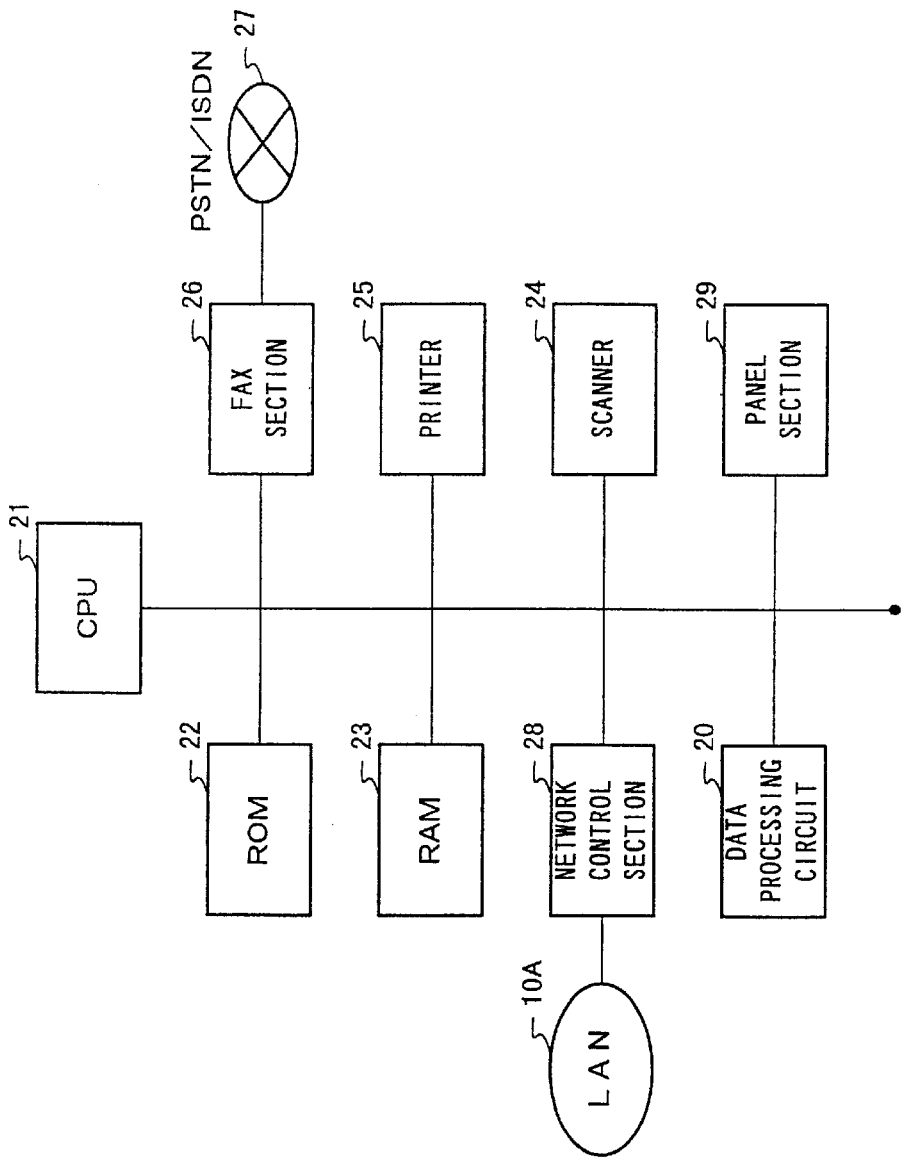
FIG. 2 is a hardware configuration view of IFAX according to the first embodiment of the present invention.

FIG. 2 shows a hardware configuration of IFAX 11A. A CPU 21 executes a program, and controls the entire apparatus. A ROM 22 stores the program executed by the CPU 21. A RAM 23 is a main memory, which executes the program and temporarily stores various kinds of data such as an e-mail, an image file, etc. A scanner 24 scans an original, and obtains image information. A printer 25 prints out received image information. A FAX section 26 receives and transmits data by facsimile communications, and performs modulation/demodulation processing when data is received and transmitted on a telephone network (PSTN/ISDN) 27. A network control section 28 is an interface that executes procedures necessary for receiving and transmitting the e-mail over the Internet 1. A panel section 29 has a plurality of One-touch dialing keys and a plurality of touch panels, and receives operations of a designation of a destination terminal, an instruction of a transmission start, etc., which are done by an operator. A data processing circuit 20 comprises a plurality of processing blocks such as a compression/decompression section, a scaling section, a resolution converting section, an encryption processing section, and a color/monochrome section, etc. An operation of each processing block is controlled by the CPU 21.

Figure 3:
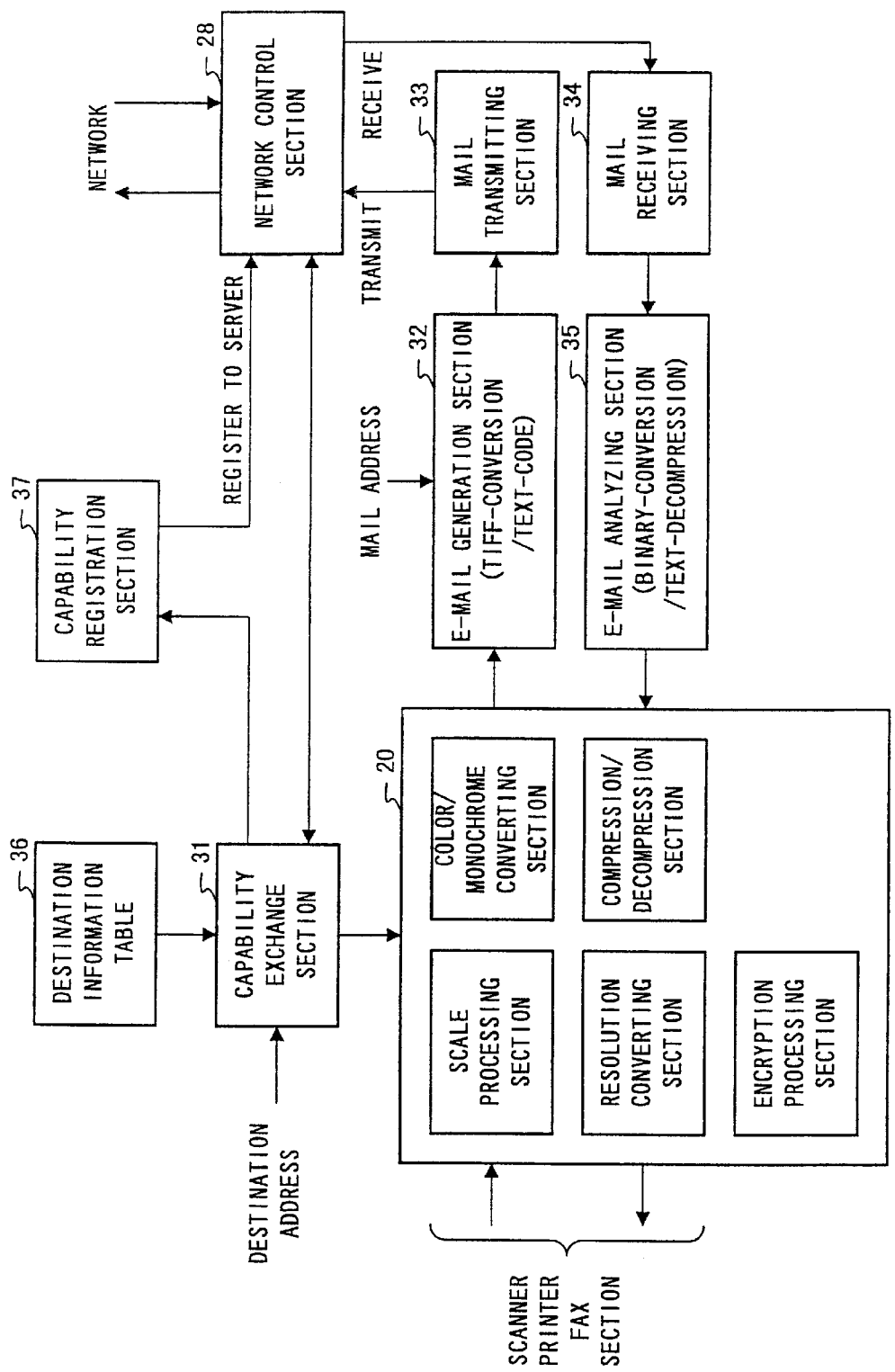
FIG. 3 is a functional block view in which a part of functions of IFAX according to the first embodiment of the present invention is extracted.

In FIG. 3, there is shown a functional block in which a specific function, which is realized by executing the program, is extracted. In IFAX 11A, an image signal of an image scanned by the scanner 24 is input to the data processing circuit 20. A capability exchange section 31 has a function of obtaining capability information of a destination terminal by use of a capability exchange operation to be described later. In the respective processing blocks provided in the data processing section 20, CPU 21 control their operation sequence in accordance with the capability of the destination terminal. For example, the compression/decompression section compresses the image signal in a compression format with which the destination terminal can deal. When IFAX 11A has a color function but must send a monochromatic image since the destination terminal has no color function, the color/monochrome section of IFAX 11A can convert a color image to a monochromatic image.

An e-mail generation section 32 generates an e-mail including image data output from the data processing section 20. The e-mail generation section 32 converts image data to a TIFF file. The TIFF file can store a plurality of compressed data corresponding to a plurality of pages with one file. A destination address of the e-mail according to an input from the panel section 29 is sent to the e-mail generation section 32. Next, an e-mail including one or a plurality of TIFF files as an appended file is generated. In other words, the TIFF file is text-coded, and put into a data section of a multi part mail in accordance with, for example, MIME (Multipurpose Internet Mail Extensions). Thereafter, the e-mail generated by the e-mail generation section 32 is transmitted to a mail server via the network control section 28 by a mail transmitting section 33.

While, a mail receiving section 34 receives an e-mail from the mail server 15A. The received e-mail is input to an e-mail analyzing section 35. The e-mail analyzing section 35 binary-converts an appended file portion of the received e-mail, which has been text-coded. The appended file portion binary-converted is decompressed from the TIFF file to an image signal by unit of page.

The data processing circuit 20 processes the image signal input from the e-mail analyzing section 35. For example, if the image signal is one that is compressed, the compression/decompression section decompresses the image data in a decompression format corresponding to a compression format, and the encryption processing section decodes encrypted data so as to be decompressed. The decompressed image signal is output to the printer 25. It should be noted that compressed image data is output to the FAX section 26 when an instruction about transfer to the other facsimile apparatus is included in the received e-mail.

Destination terminal information is pre-registered in a destination information table 36. FIG. 4 shows a specific example of destination terminal information registered in the destination information table 36. Destination terminal information includes a number of an One-touch dialing key allocated to each destination terminal, a telephone number, a mail address, etc.

A capability registration section 37 has a function of registering capability information of the destination terminal newly obtained to the server 13A. An instruction of registration and capability information are input to the capability registration section 37 from the capability exchange section 31. The capability registration section 37 gains access to the server 13A via the network control section 28.

The server 13A has a function of notifying the capability exchange section 31 of capability information about the destination terminal in response to inquiry from the capability exchange section 31. The server 13A stores capability information about the destination terminals in a capability exchange table 50. Also, the server 13A registers capability information whose registration is requested from the capability registration section 37 into a capability exchange table 50.

FIG. 5 shows a configuration example of the capability exchange table 50. In the capability exchange table 50, one or a plurality of names of the kind of destination terminal is registered to be associated with the mail address of the destination terminal. Capability of the destination terminal is determined in accordance with the kind of destination terminal. In the capability exchange table 50, a capability table is prepared for each kind of destination terminal. In the capability table, there are described capability items such as resolution, a paper size, a compression format, an encryption format, color, and the other, and a capability content corresponding to each capability item.

In this way, by managing the capability of the destination terminal by the name of kind of apparatus, a data capacity of the capability exchange table 50 can be reduced as compared with a case in which capability information is registered for each destination terminal. The destination terminal of the same kind of terminal is regarded as the terminal that has substantially the same capability. Therefore, if the capability of the destination terminal is managed by the name of the kind of apparatus, overlaps of data can be avoided, and data can be managed with efficiency.

The DNS server 14A has a function of managing a domain name, and a function of managing the capability of a network terminal. A zone information table for realizing the above two functions is stored in an internal memory 60A of the DNS server 14A. The structure of the zone information table is shown in FIG. 6. The zone information table comprises a plurality of records including a MX (Mail Exchange) record, an A (address) record, and a FX (Fax Exchange) record, which is an expansion record. A delivery destination of a mail to an original (domain name: abc.co.jp) is described in the MX record. The delivery destination of the mail to the domain name of abc.co.jp is mail-gate @ abc.co.jp. In the A record, a host name, and an IP address corresponding thereto are described. The host name registered in the zone information table includes a mail server (mail-gate) of the zone, and IFAX (ifax1, ifax2). In the FX record expanded this time, capability information of IFAX is described. Capability information includes a name of the kind of IFAX, a paper size, color/monochrome, a compression format, an encryption format, resolution, and other information. DNS comprises numerous DNS servers distributed on the Internet. The DNS servers are arranged along the tree structure of the domain name, and the DNS severs to which authority of managing the domain name is given for each hierarchy of the sub-domain are present. The range of the domain name managed by one DNS server is called zone. In the present invention, the plurality of DNS servers constituting DNS constructs a data base, which carries out distributed management of the capability of the network terminal connected onto the Internet, on the Internet.

According to this embodiment, the capability of the network terminal (IFAX 11A or 11B) existing in the zone where the DNS server (14A or 14B) manages the domain name is described in the FX record. Therefore, if the capability of the network terminal existing in the zone is registered in each DNS server, capability information of each network terminal is registered in any one of DNS severs. Since DNS can search for the DNS server managing the domain name, it is possible to easily search for the DNS server in which capability information of a network terminal is registered from the mail address (domain name) of the network terminal.

Next, the following will explain an operation, which is executed when the capability exchange is performed by the above-structured communication system. In the explanation set forth below, it is assumed that IFAX 11A on the first LAN 10A is a transmitter terminal and IFAX 11B on the second LAN 10B is a destination terminal.

Figure 7:
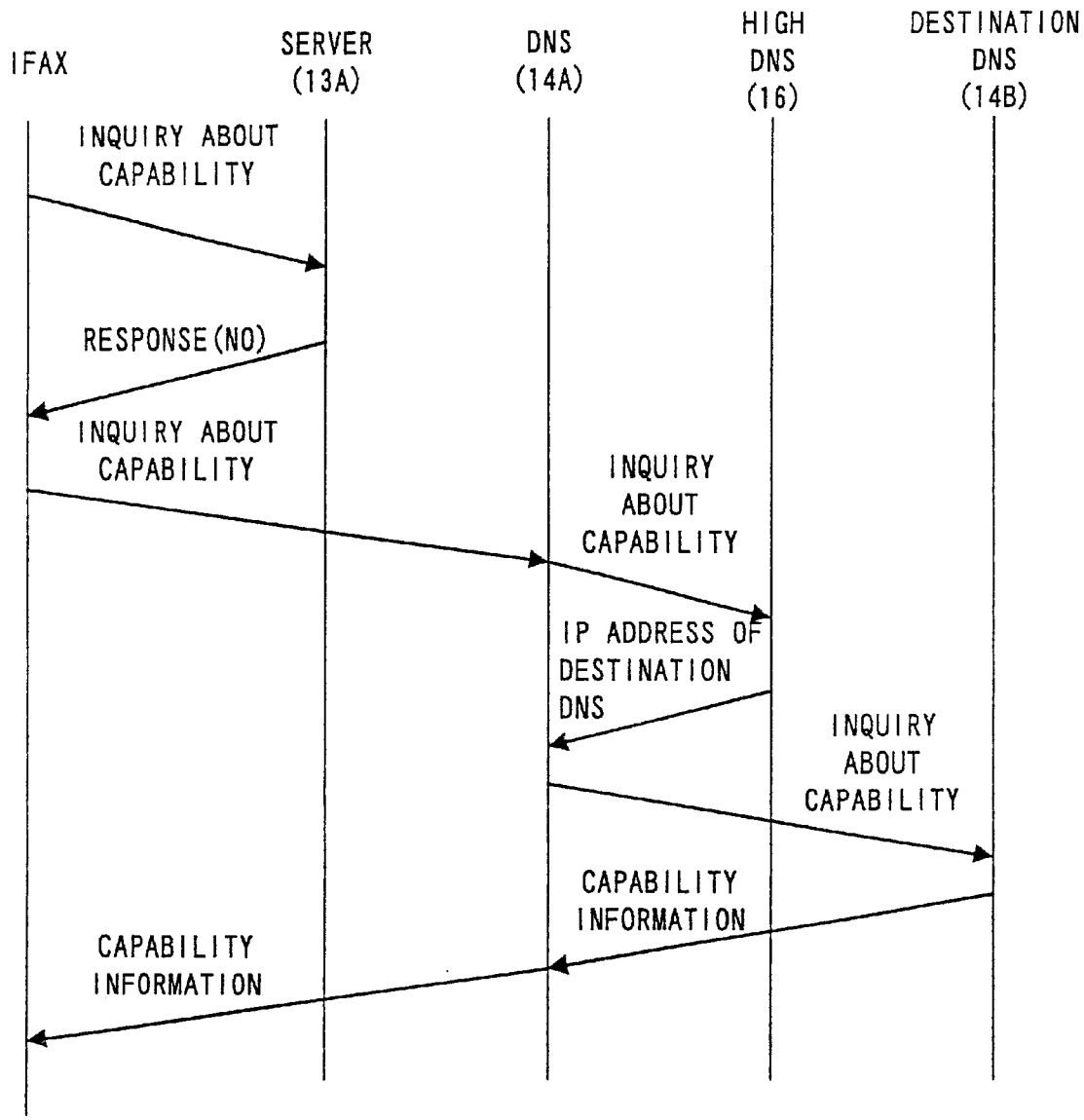
FIG. 7 is a sequence view for a capability exchange according to the first embodiment.

FIG. 7 shows one example of a sequence performed until IFAX 11A on the transmitter side obtains the capability of IFAX 11B on the receiver side from the server 14B. In other words, FIG. 7 shows the sequence of a case in which the capability information of IFAX 11B on the receiver side is not registered in the server 13A.

The IFAX 11A makes inquiry about capability information of a desired destination terminal (IFAX 11B) to the server 13A. In this example, capability information of the desired destination terminal is not registered in the server 13A. Therefore, the server 13A sends back a response in which no capability information is registered to IFAX 11A.

Next, IFAX 11A makes inquiry about capability of the destination terminal to the DNS server 14A, which manages the self-domain name, by use of a name resolver (client software for DNS). The inquiry about capability information is carried out using a command for requesting capability information and a mail address of the destination terminal.

Figure 8:
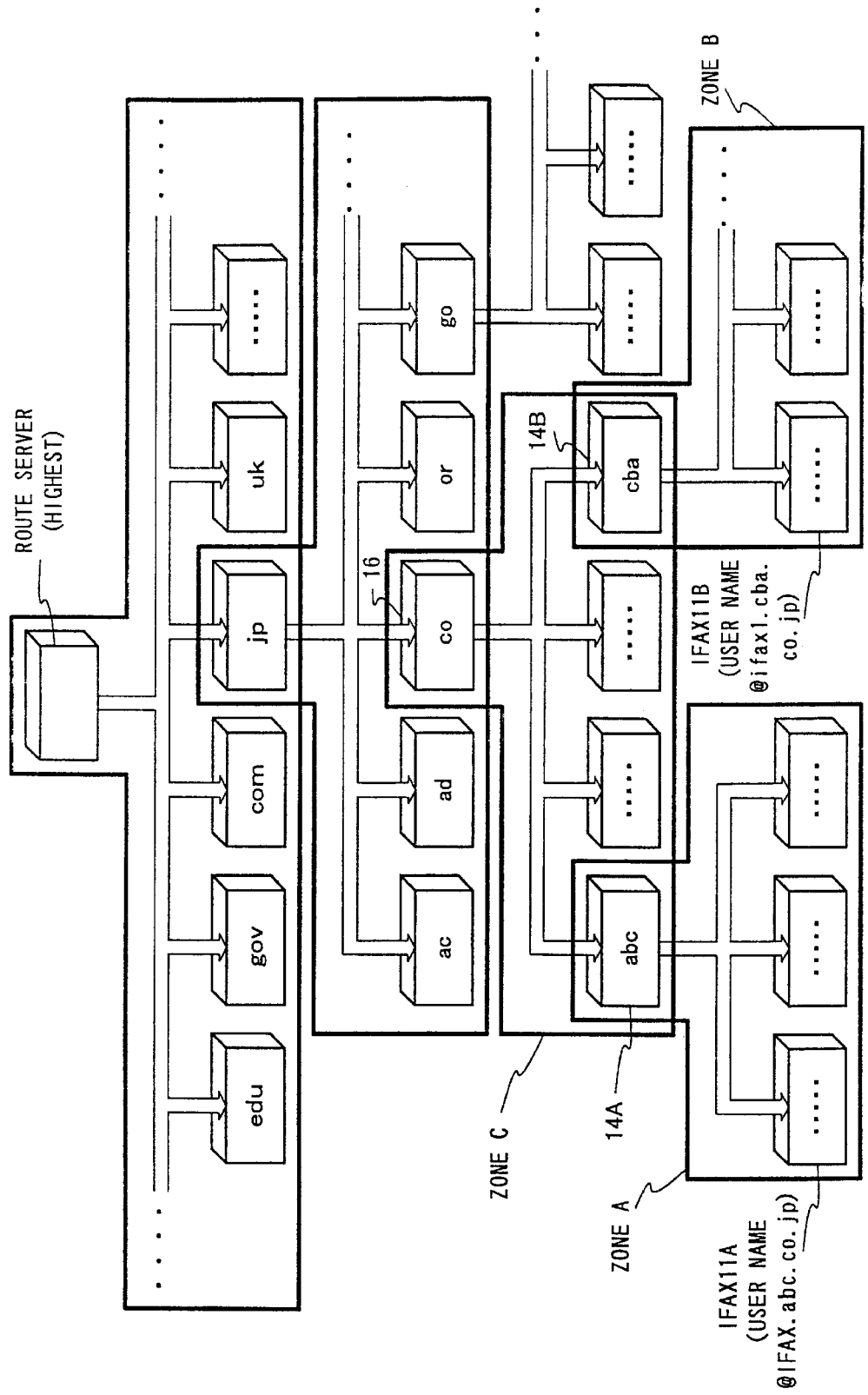
FIG. 8 is a view showing the structure of a domain name management in DNS.

The structure of the domain name management in DNS will be explained with reference to FIG. 8. The DNS server 14A manages a domain name (abc: third hierarchy) in a zone A, and the DNS server 14B manages a domain name (cba: third hierarchy) in a zone B. The high DNS server 16 manages a domain name (co: second hierarchy) in a zone C including DNS servers 14A and 14B therein.

A case in which the IFAX 11A makes inquiry to the DNS server 14A, which manages the zone A by use of the domain name (cba.co.jp) of IFAX 11B will be explained. The DNS server 14A makes inquiry to the high DNS server 16, which manages the domain name (co: second hierarchy) of the zone C to which the DNS server 14A belongs since the domain name (cba) is not included in the zone A. An IP address of the high DNS server 16, which manages the domain name of the zone C, is one that is cached at an initial obtaining time.

The high server DNS 16 grasps the domain names (third hierarchy), which are managed by the low DNS server belonging to the zone C. For this reason, the high DNS server 16 can see that the domain name (cba) inquired is managed by the DNS server 14B. The DNS server 14A is notified of the IP address of the DNS server 14B from the high DNS server 16. DNS can thus surely know the IP address of the DNS server, which manages a desired domain name by going back to the high DNS server.

The DNS server 14A, which has received inquiry from the IFAX 11A, sends back a response of corresponding capability information to the IFAX 11A when the inquiry can be solved by a zone information table 60A, which the DNS server 14A itself has. In this example, capability information of the destination terminal is not registered in the DNS server 14A. In an unsolvable case, that is, a case of inquiry about a domain name of a zone other than the self-zone, inquiry is made to the high DNS server 16. This inquiry is referred to as recursion.

When the high DNS server 16, which has received inquiry, finds out a DNS server, which seems to grasp a corresponding domain name, the DNS server 16 notifies the DNS server 14A of an IP address of the DNS server. When the high DNS server 16 cannot specify the DNS server, which seems to grasp the corresponding domain name, the DNS server 14A makes inquiry about capability to higher DNS server.

The IP address of the DNS server 14B, which manages the domain name included in the mail address of the destination terminal (IFAX 11B), is thus obtained. The DNS server 14A makes inquiry about capability of the destination terminal (IFAX 11B) to the DNS server 14B by use of the obtained IP address.

As mentioned above, capability information of the destination terminal (IFAX 11B) is registered in the DNS server 14B, which manages the domain name of the desired destination terminal (IFAX 11B). Therefore, the DNS server 14B gives a response of capability information of the desired destination terminal to the DNS server 14A. The DNS server 14A transmits the obtained capability information of the destination terminal to the IFAX 11A.

Also, in DNS, even if the low DNS server(14A), which has received inquiry from the client, makes inquiry to a route server, which manages a top domain directly, it is possible to search for an IP address of a DNS server, which manages a desired domain name. In this case, the route server transmits an IP address of a high DNS server, which manages the domain name (jp) of the first hierarchy, to the low DNS server (14A). Sequentially, when the low DNS server (14A) makes inquiry to the high DNS server, which manages the domain name (jp) of the first hierarchy, the IP address of the high DNS server 16, which manages the domain name (co) of the second hierarchy, is transmitted to the low DNS server (14A). Moreover, when the low DNS server (14A) makes inquiry to the low DNS server 16, the IP address of the low DNS server 14B, which manages the domain name to which the desired destination terminal belongs, is transmitted to the low DNS server (14A).

Figure 9:
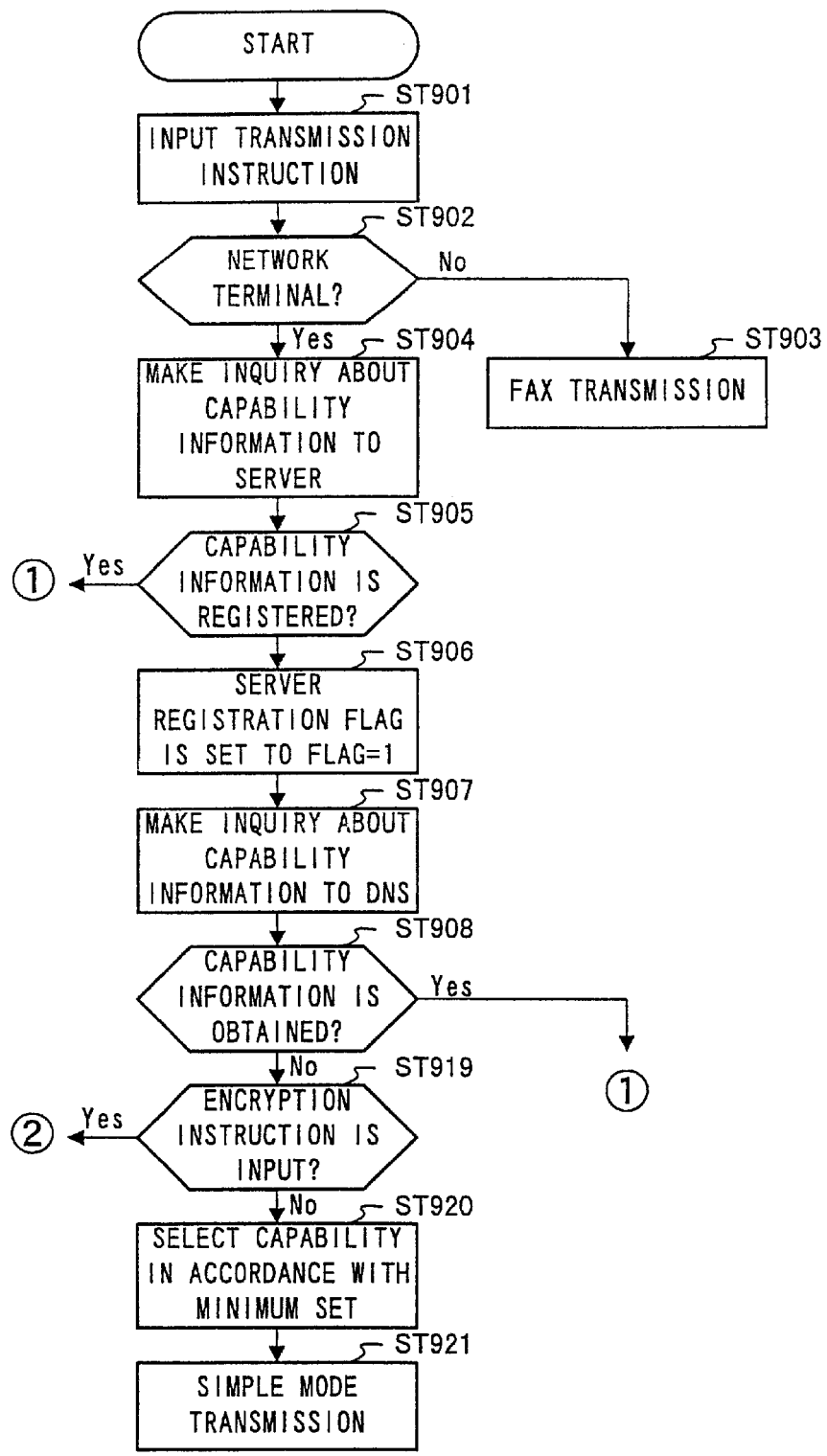
FIG. 9 is a flowchart showing the first half of operations for obtaining capability information according to the first embodiment of the present invention.
Figure 10:
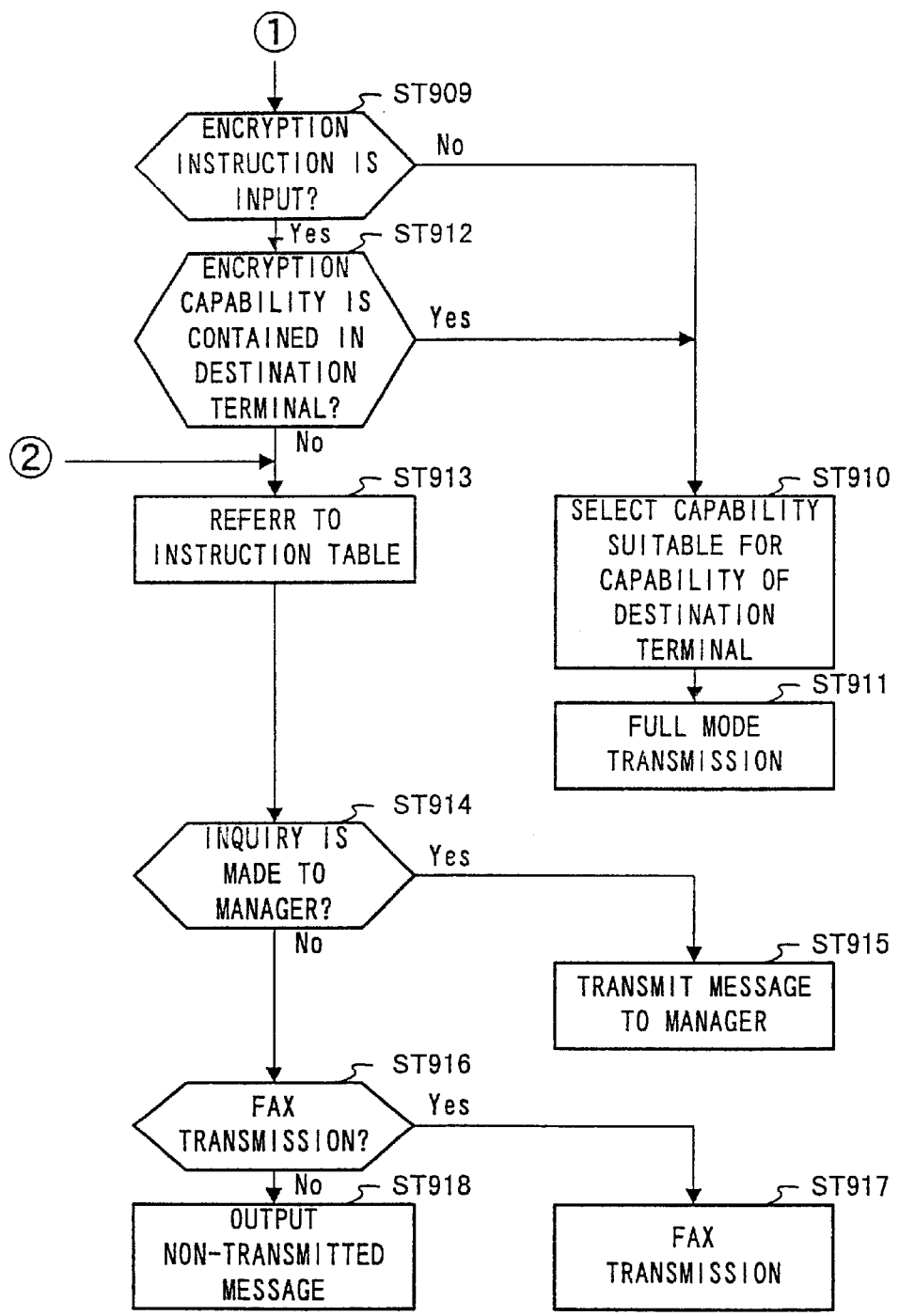
FIG. 10 is a flowchart showing the second half of operations for obtaining capability information according to the first embodiment of the present invention.

FIGS. 9 and 10 are flowcharts showing a series of processing, which is from the time when IFAX 11A makes inquiry about capability information to the time when an image is transmitted. A destination is designated by the panel section 29 and a transmission instruction is input (ST901). When the destination terminal is a network terminal, a mail address, a telephone number (IFAX) or an One-touch dialing key number are input. Also, when the destination terminal is a G3 facsimile apparatus, a telephone number or an One-touch dialing key number is input.

In step ST902, the capability exchange section 31 recognizes that the destination terminal is the network terminal when the mail address is input. In a case where the telephone number or the One-touch dialing key number is input, it is determined whether or not the destination terminal is the network terminal using the destination information table 36. If the same data as the input telephone number or the One-touch dialing key number is registered in the destination information table 36 and a mail address corresponding to such data is registered therein, the destination terminal is recognized as a network terminal. In the other cases, it is determined that the destination terminal is the G3 facsimile apparatus.

In step ST902, when it is determined that the destination terminal is the G3 facsimile apparatus, the FAX section 26 carries out capability exchange in accordance with a normal facsimile procedure. Then, the data processing circuit 20 provides processing, which is suitable for the capability of a destination FAX, to an image signal, thereafter such an image signal is transmitted to a telephone network from the FAX section 26 (ST903).

When it is determined that the destination terminal is the network terminal in step ST902, inquiry about capability information of the destination terminal is made to the server 13A via the LAN control section 28 (ST904). An HTTP protocol can be used in communications between IFAX 11A and the server 13A.

It is possible to request only capability information of an arbitrary item from capability information registered in the capability exchange table 50 of the server 13A. For example, when information of the paper size and the encryption format are not needed, item numbers of the paper size and the encryption format and filtering instruction data are added to a command for requesting capability information. As a command, a CGI command can be used. A request for CGI processing for filtering capability information is given to the server 13A.

If capability information of the destination terminal is registered in the capability exchange table 50 of the server 13A, IFAX 11A is notified of capability information from the server 13A. If capability information of the destination terminal is not registered in the capability exchange table 50 of the server 13A, IFAX 11A is notified of a message in which no capability information is registered from the server 13A. In this example, it is assumed that capability information is not registered in the server 13A.

Also, when filtering of capability information is instructed as a result of analyzing a CGI string from the IFAX 11A and filtering of capability information is instructed, the server 13A starts an application and deletes capability information of the instructed item from capability information. Then, filtered capability information is transmitted to the IFAX 11A as a response.

The capability exchange section 31 recognizes that no capability information of the desired destination terminal is registered in the server 13A from the message received from the server 13A (ST905). In a case where no capability information of the desired destination terminal is registered in the server 13A, a server registration flag is set to flag=1 (ST906). The server registration flag is a flag showing that capability information is registered in the server 13A after capability information is obtained.

In ST905, when it is determined that no capability information of the desired destination terminal is registered in the server 13A, inquiry about capability information of the destination terminal is made to the DNS server 14A, which manages the domain name of the same zone (A), by use of the mail address of the destination terminal (ST907). The inquiry about capability information is made using a command for requesting capability information and the mail address of the destination terminal (IFAX 11B). As explained above, the destination DNS server (14B), which manages the domain name of the destination terminal (IFAX 11B), is determined at the point where the network of the DNS server goes back to one higher DNS server 16. The DNS server 14A of a demander is notified of the IP address of the destination DNS server 14B from the high DNS server 16. The DNS server 14A obtains capability information from the destination DNS server (14B) as mentioned above and transmits it to IFAX 11A.

The capability exchange section 31 of IFAX 11A obtains capability information of the destination terminal from the DNS server 14A (ST908). Thereby, it possible to surely obtain capability information only by making inquiry to the DNS server even if capability information of the destination terminal is not registered in the server 13A, which is first inquired. The reason is that capability information of the destination terminal is registered in the DNS server, which is searchable by the mail address of the destination terminal.

Here, there is an encryption function as one of capabilities, which the network terminal has. The IFAX 11A can encrypt transmitting data by a predetermined encryption format to increase the security of data to be transferred on the Internet. The encryption can be instructed to the capability exchange section 31 by a button operation from the panel section 29. If an encryption decoding function is not mounted on the destination terminal, the destination terminal cannot decode transmitting data. For this reason, whether or not the encryption decoding function, which corresponds to the encryption format on the transmitter side, is mounted on the destination terminal must be confirmed by capability exchange.

In step ST909, when it is determined that the encryption of the transmitting data is not instructed from the panel section 29, a processing sequence and a processing parameter in the data processing circuit 20 are determined (ST910). In this transmission, the processing section to be used in the data processing circuit 20 and the order of processing are determined by the processing sequence. The processing parameter determines parameters such as a scaling rate suitable for the paper size and resolution suitable for destination resolution, which are used in the processing section.

In step ST911, the capability exchange section 31 controls the necessary processing sections of the data processing circuit 20 in accordance with the processing sequence and the processing parameter determined in step ST910. An image signal to which processing suitable for the capability of the destination terminal is provided is output to the e-mail generation section 32. Then, the e-mail generation section 32 generates an e-mail including image data, and transmits it to the mail server 15B having a mail box for a destination terminal from the mail transmitting section 33. Thus, communications, which is suitable for the capability of the destination terminal, is referred to as full mode transmission. When it is determined that the encryption of the transmitting data is input from the panel section 29 in step ST909, it is determined whether or not an encryption function (including encryption decoding section) is contained in the capability information of the destination terminal previously obtained (ST912). As a result, if the encryption function is contained in the capability information of the destination terminal, processing goes to step ST910 and a processing sequence containing the encryption is determined. While, if the encryption function is not contained in the capability information of the destination terminal, CPU 21 determines measures in accordance with an instruction table stored on the ROM 22 (ST913). In the instruction table, there is described a method of taking measures against a case in which no encryption function is mounted on the destination terminal, which receives transmitting data, which has been instructed to encrypted. As a result of referring to the instruction table, if inquiry to a manager's terminal is described as measures therein (ST914), a message relating to inquiry is transmitted to a predetermined manager's network terminal (ST915). The message relating to inquiry and an address of the manager's network terminal are given to the e-mail generation section 32. The e-mail generation section 32 generates an e-mail including the message relating to the inquiry and a destination address to which the address of the manager's network terminal is inserted. The generated e-mail is transmitted to the manager's network terminal. Also, as a result of referring to the instruction table, if a FAX transmission of transmitting data to the destination terminal is described as measures therein (ST916), transmitting data is sent to the destination terminal in a G3 mode by the FAX section 26 (ST917). In the FAX transmission in step ST917, the FAX section 26 carries out capability exchange in accordance with a normal facsimile procedure. A telephone number of the destination terminal is obtained from the destination information table 36.

Also, as a result of referring to the instruction table, if an output of a non-transmitted message is described as measures therein in step ST913, the non-transmitted message is displayed on a display of the panel section 29 (ST918). Or, the non-transmitted message is printed out by the printer 25 (ST918).

Thus, when an encryption decoding function corresponding to the encryption format on the transmitter side is not mounted on the destination terminal even though the instruction of decoding transmitting data is given, transmitting data can be prohibited from being transmitted onto the Internet without being encrypted.

It should be noted that communications moves to a simple mode transmission to be described later if capability information cannot be obtained for any reason in processing of step ST908. In this case, the capability exchange section 31 confirms that the encryption instruction is not input (ST919), thereafter determining the processing sequence of the data processing circuit 20 and the processing parameter to be suited to the capability as per a minimum set (ST920). An image signal output from the data processing circuit 20 is converted to the e-mail by the e-mail generation section 32, and transmitted in accordance with the simple mode (ST921).

Also, when IFAX 11A obtains capability information non-registered in the server 13A by the above-mentioned capability exchange, IFAX 11A registers the capability information to the server 13A.

Figure 11:
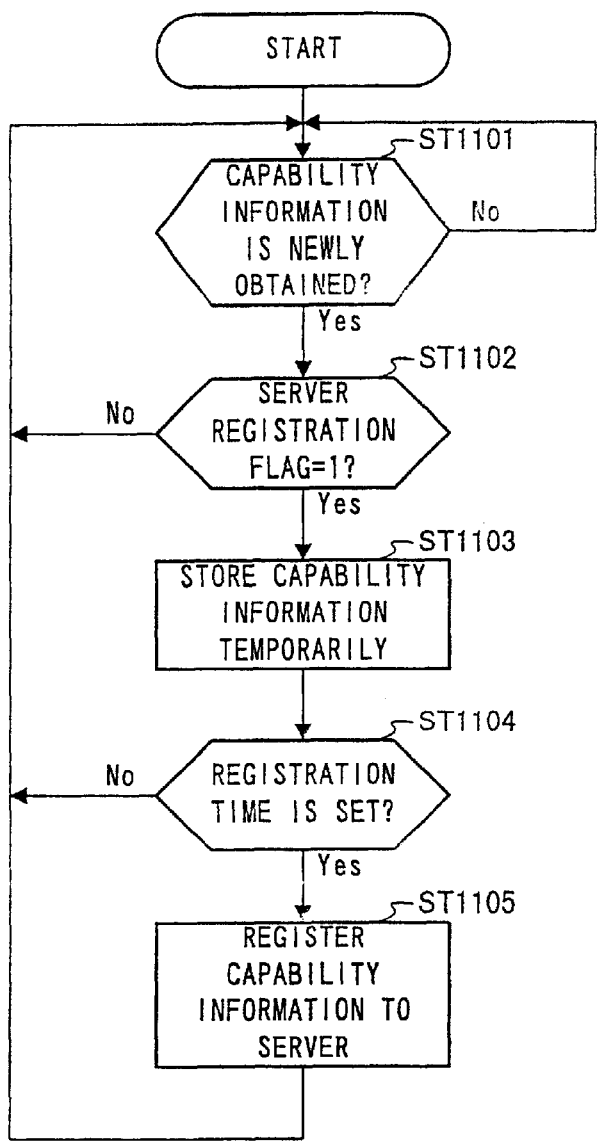
FIG. 11 is a flowchart showing operations for registering capability information according to the first embodiment of the present invention.

FIG. 11 shows a flowchart for registering capability information to the server 13A. The capability exchange sect ion 31 determines whether or not the server registration flag is set to flag=1 (ST1102) when obtaining capability information from an external section (ST1101). A case of flag=1 shows the fact that no capability information is registered in the server 13A. In this case, the obtained capability information of the destination terminal and the mail address are stored in a specific address on the RAM 23 (ST1103).

A time zone where capability information is registered in the server 13A is predetermined. According to the embodiment, a time zone where the operating ratio of the server 13A is reduced is set as a registration time zone in the capability registration section 37. By use of the time zone where the operating ratio of the server 13A is reduced, a possibility decreases where a capability registration operation and the other will be overlapped with each other. For this reason, capability information can be obtained without increasing a load on the server 13A. If the capability of the server 13A is sufficiently high, capability information may be registered to the server 13A at the time when new capability information is obtained. Or, when spare time is generated, capability information may be registered to the server 13A.

When current time is the registration time zone (ST1104), the capability registration section 37 extracts the capability information of the destination terminal and the mail address thereof from the specific address on the RAM 23. Then, the capability registration section 37 transmits a command for requesting a registration and registration information (capability information of the destination terminal and the mail address thereof) to the server 13A (ST1105). As a result, capability information is newly registered in the server 13A. Thereby, capability information of the destination terminal to which the capability exchange has been provided by the network terminal of the LAN 10A is automatically registered to the server 13A.

Figure 12:
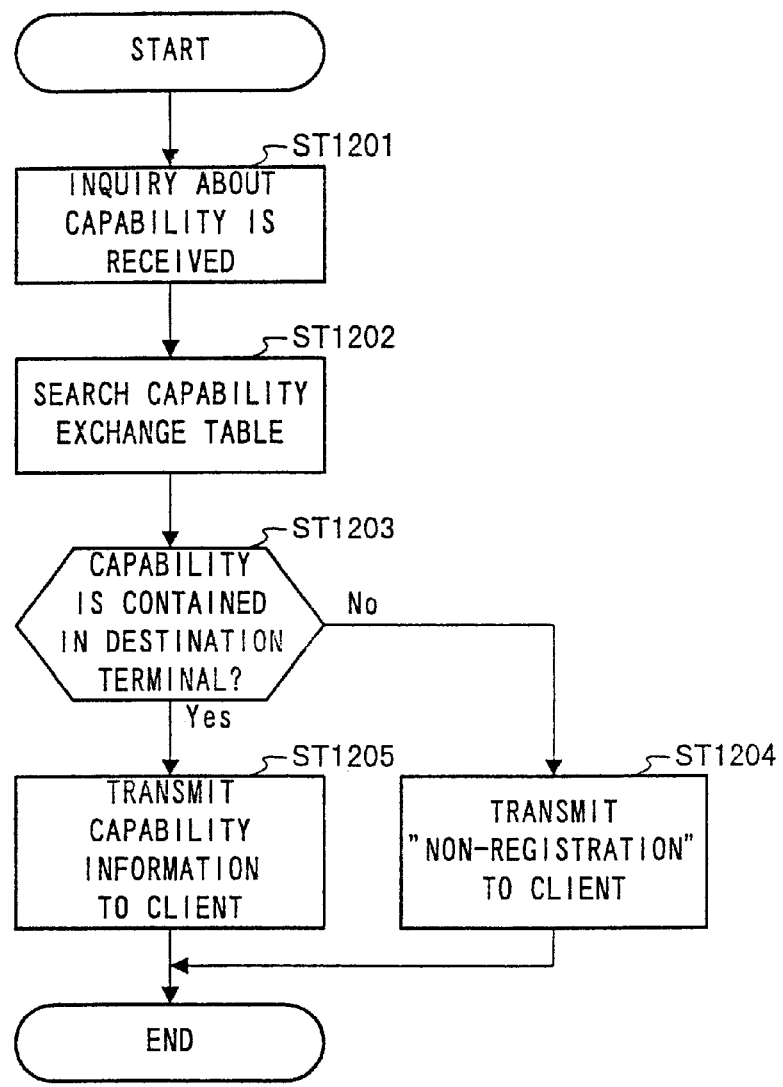
FIG. 12 is a flowchart showing operations for inquiry about capability in a server according to the first embodiment of the present invention.

Next, an operation of the server 13A will be explained. FIG. 12 is a flowchart showing a case in which the server 13A provides capability information. After the server 13A receives inquiry about capability information from the IFAX 11A (ST1201). The server 13A searches the capability exchange table 50 for capability information using the mail address instructed from the IFAX 11A (ST1202).

The server checks whether or not capability information of the destination terminal is registered in the capability exchange table 50 (ST1203). If the capability information is not registered in the capability exchange table 50, the server 13A sends the IFAX 11A as a client a response in which no capability information is registered (ST1204). Also, if the capability information is registered in the capability exchange table 50, the server 13A transmits capability information to the IFAX 11A (ST1205).

Figure 13:
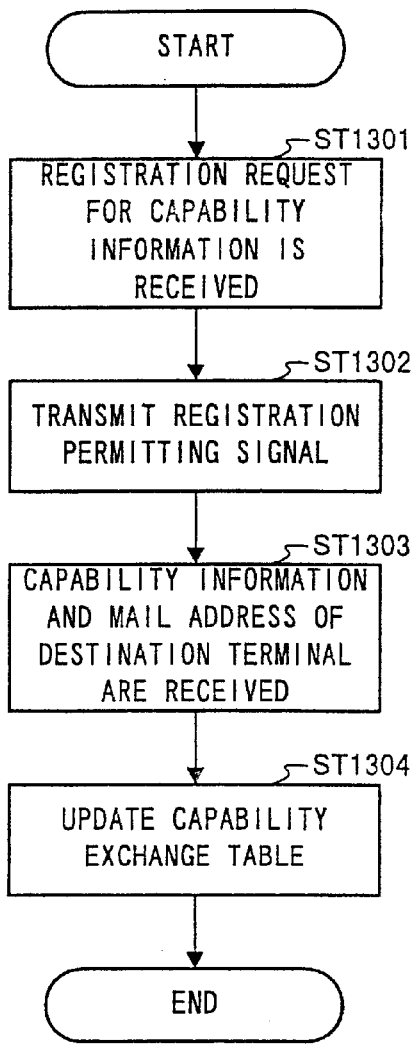
FIG. 13 is a flowchart showing operations for a capability registration in the server according to the first embodiment of the present invention.

FIG. 13 shows a flowchart for registering capability information to the server 13A. The server 13A receives a registration request for capability information from the IFAX 11A (ST1301). If the server 13A finishes preparations, the server 13A transmits a registration permitting signal to the IFAX 11A (ST1302). Thereafter, capability information (name of the kind of apparatus and capability table) of the network terminal and the mail address thereof are sent from the IFAX 11A (ST1303). The server 13A makes the mail address of the network terminal and capability information corresponded to each other, and registers them in the capability exchange table 50 (ST1304). At this time, if the capability table corresponding to the name of the kind of apparatus is already registered therein, only the name of the kind of apparatus may be registered thereto. Also, if a telephone number is also registered to the capability exchange table 50, it is possible to search capability information even when not only the mail address but also the telephone number is used as a key. For that end, the IFAX 11A transmits data in which the telephone number is added to the capability information of the network terminal and the mail address thereof.

Figure 14:
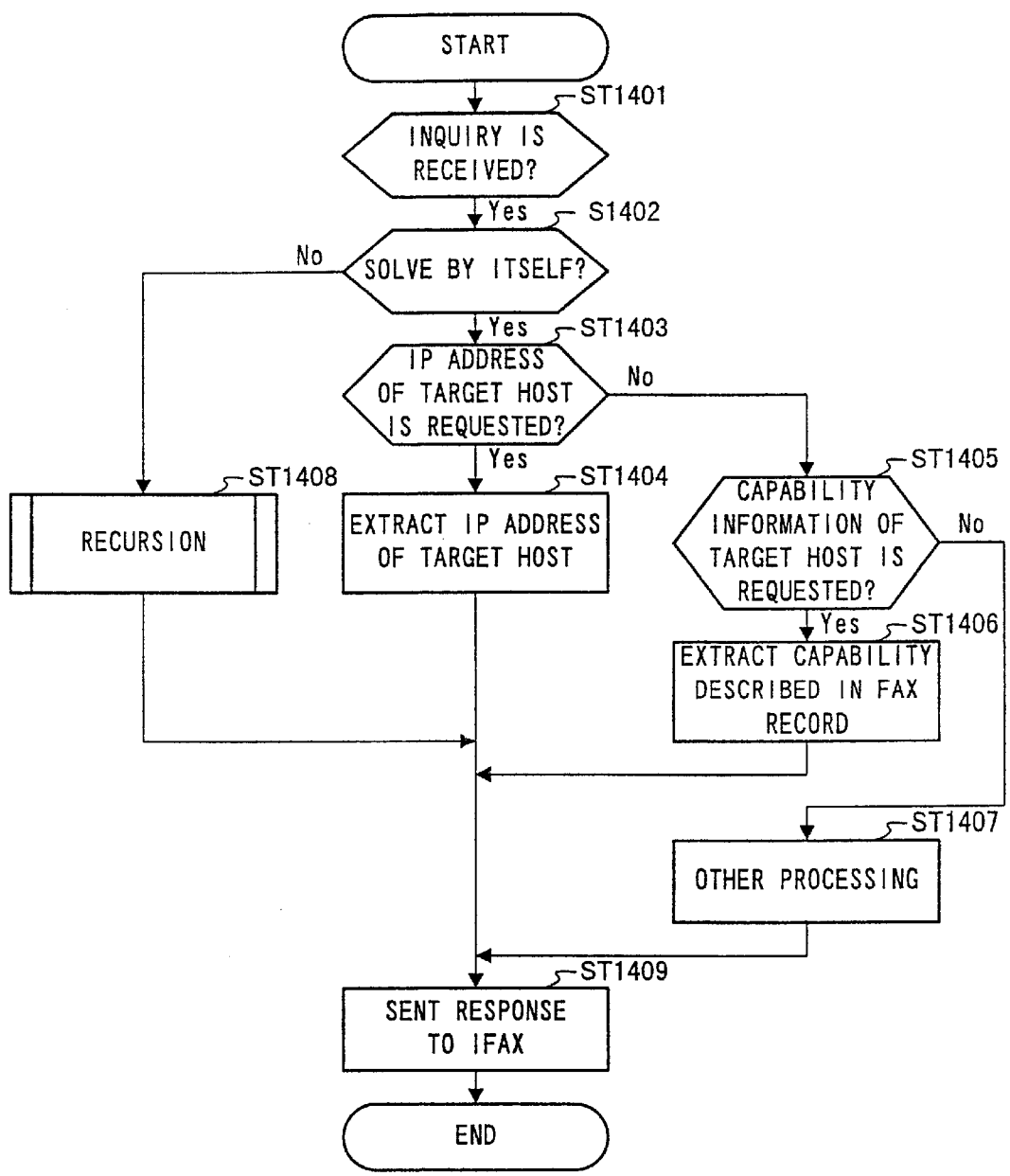
FIG. 14 is a flowchart showing operations in a DNS server according to the first embodiment of the present invention.

Next, an operation of the DNS server 14A will be explained. FIG. 14 is a flowchart showing a schematic operation of the DNS server 14A. The DNS server 14A receives inquiry about capability, which the IFAX 11B possesses, from the IFAX 11A belonging to the zone A (LAN 10A)(ST1401). The IFAX 11A makes inquiry using a command for requesting capability information and a mail address of a destination terminal (host: IFAX 11B).

The DNS server 14A determines whether or not the DNS server 14A can solve inquiry by itself (ST1402). If the inquiry is one that is related to the domain name, which the DNS server 14A manages, the DNS server 14A determines that the inquiry is solvable. If it is determined that the inquiry is solvable in step ST1402, the DNS server 14A determines whether or not an IP address of the host is requested (ST1403). If the IP address of the host is requested, the DNS server 14A extracts an IP address of a target host from the zone information table 60A (ST1404).

While, if it is determined that the IP address of the host is not requested in ST1403, it is determined whether or not capability information of the target host is requested (ST1405). If it is determined that capability information of the target host is requested in ST1405, capability information described in the FAX code in connection with the target host is extracted from the zone information table 60 (ST1406). For example, if a host name (ifax1) is included in the mail address as in "xxx @ ifax1.abc.co.jp", capability information is searched and obtained using a FAX record in connection with the host name (ifax1). Also, if no host name is included in the mail address as in "xxx @ abc.co.jp", capability information is searched and obtained using a user name (xxx) put before @ mark. In this case, the mail address or the user name is registered in a name item for a zone information table. In the case of the other inquiries, corresponding processing is executed in step ST1407.

If it is determined that the inquiry is unsolvable in step ST1402, the inquiry is transferred to the high DNS server 16 (ST1408). Since the IP address of the DNS server is sent from the high DNS server 16, the inquiry is output to the other DNS server using the IP address. The repetition of this processing obtains a response to the inquiry. Thus, the searching of desired information in place of the client is referred to as recursion.

The DNS server 14B has a zone information table 60B, which is structured in the same manner as the zone information table of FIG. 6, and operates in accordance with the flowchart of FIG. 14. In the zone information table 60B, capability information of IFAX 11B is described in the FAX record. For example, ifax1 registered in the table of FIG. 6 is the host name included in the mail address of IFAX 11B. Namely, capability information of IFAX11B is described in the FAX record corresponding to ifax1.

In a case where the DNS server 14B receives inquiry about IFAX 11B from the DNS server 14A, capability information is extracted from the FX record corresponding to the host name included in the mail address. Then, extracted capability information is transmitted to the DNS server 14A.

Though CPU is used in communications between the network terminal of inquiry and the DNS server, the other communication protocol may be used.

(Second Embodiment)

The communication system according to a second embodiment has the same system structure as the communication system according to the first embodiment. In this embodiment, the IFAX 11A changes a server, which first obtains capability information, in accordance with an address of the destination terminal.

Figure 15:
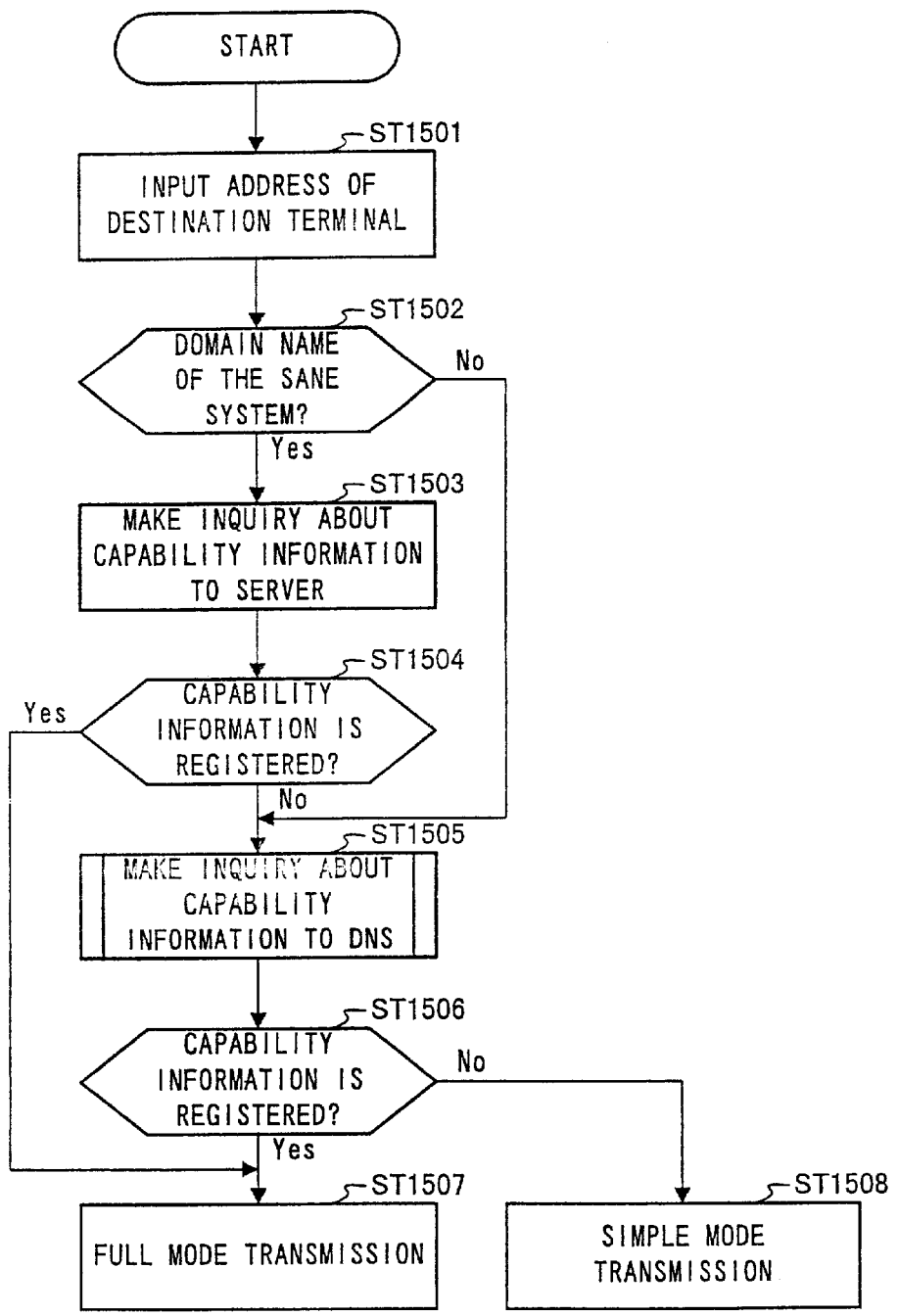
FIG. 15 is a flowchart showing operations for which IFAX selects a server to which inquiry should be made in a communication system according to a second embodiment of the present invention.
Figure 16:
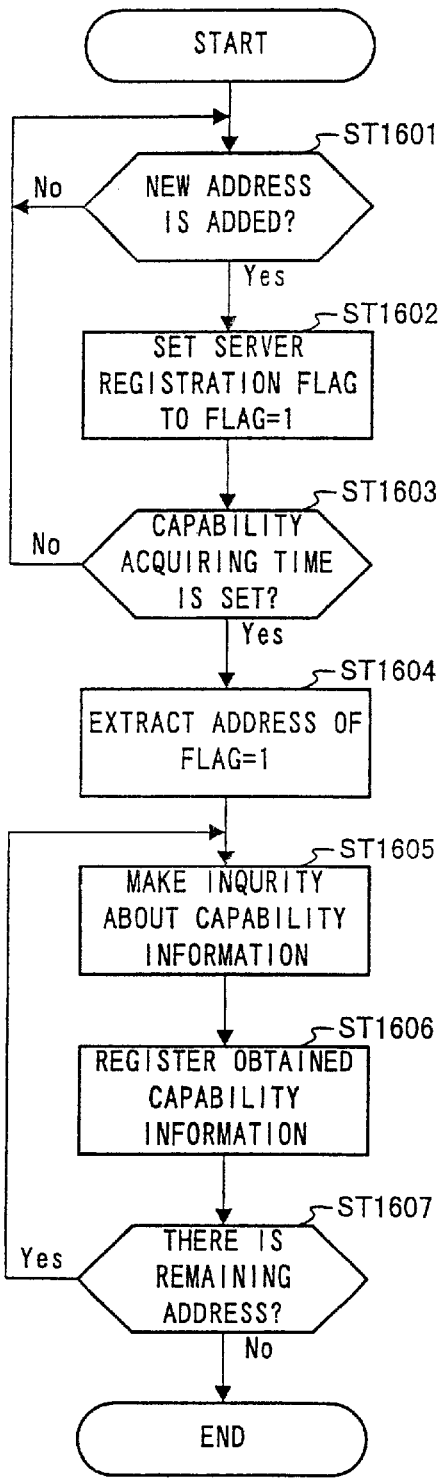
FIG. 16 is a flowchart showing operations for which IFAX registers capability information in a communication system according to a third embodiment of the present invention.

FIG. 15 is a flowchart showing a series of processing, which is from the time when IFAX 11A obtains capability information from a server (server 13A or DNS server) to the time when information is transmitted. A mail address of a destination terminal is input (ST1501). Then, it is determined whether or not a domain name of the destination terminal is a domain name of the same system (ST1502).

Here, it is assumed that capability information of the network terminal of the same system including a network of LAN 10A is registered to the capability exchange table 50 of the server 13A. By checking the domain name of the network terminal, it is possible to determine whether or not desired capability information is registered in the server 13A before making inquiry to the server 13A.

If the domain of the destination terminal is the domain name of the same system in ST1502, inquiry about capability information is made to the server 13A (ST1503). In this case, there is a high possibility that desired capability information will be registered to the capability exchange table 50 of the server 13A. The server 13A checks whether or not the capability information of the destination terminal is registered in the capability exchange table 50 of the server 13A (ST1504). If the capability information is registered in the server 13A, processing moves to step ST1507 and a full mode transmission is carried out.

While, if the domain of the destination terminal is not the domain name of the same system in ST1502, inquiry about capability information to the DNS server 14A is performed without making inquiry to the server 13A (ST1505). If capability information is obtained from DNS in the same manner as the aforementioned first embodiment (ST1506), processing moves to step ST1507, and a full mode transmission is carried out. It should be noted that a simple mode transmission is carried out (ST1508), if capability information cannot be obtained form DNS for any reason (ST1506).

Thus, according to this embodiment, when the domain of the destination terminal was not the domain name of the same system, inquiry about capability information to the DNS server 14A was performed without making inquiry to the server 13A. Therefore, IFAX 11A can obtain capability information with efficiency.

According to the above-mentioned embodiment, the server first obtaining capability information was selected in accordance with the domain name of the destination terminal. However, the server may be selected in accordance with the other conditions. Also, according to the above-mentioned embodiment, the servers to be selected were the server 13A and the DNS servers in DNS. However, a plurality of servers corresponding to the server 13A is prepared and an optimum server may be selected from these servers.

(Third Embodiment)

The communication system according to a third embodiment has the same system structure as the communication system according to the aforementioned first embodiment. This embodiment shows an example in which IFAX 11A automatically obtains capability information of the network terminal in which an address is newly registered to the destination information table 36 and registers obtained capability information to the server.

When a user operates the panel section 29 so as to register a new address to the destination information table 36 (ST1601), CPU 21 sets a capability obtaining flag to flag=1 in association with the new address (ST1602). The capability obtaining flag=1 means that the new address is registered.

Next, it is determined whether or not current time is capability obtaining time (ST1603). If capability obtaining time comes, a mail address in which capability obtaining flag=1 is set and capability registration should be made is extracted from the destination information table 36 (ST1604).

If the mail address in which capability registration should be made is extracted, IFAX 11A makes inquiry about capability of a communication apparatus in which the mail address is newly registered to the DNS server 14A, and obtains capability information (ST1605).

When IFAX 11A receives desired capability information from the DNS server inquired, the capability information is registered to the server 13A (ST1606). As a result, obtained capability information is registered to the server 13A to which IFAX 11A first makes inquiry about capability information.

In processing in step ST1608, it is determined whether or not a mail address in which capability registration should be carried out remains. Then, if a target network terminal remains, processing moves to step ST1605.

Thus, according to this embodiment, when a new address registration of the network terminal is carried out in IFAX 11A, IFAX 11A automatically makes inquiry about capability information of the network terminal to DNS and obtains capability information, and obtained capability information can be registered to the server 13A to which IFAX 11A first gains access.

Also, by setting capability obtaining time to a time zone where frequency in use of IFAX 11A is decreased, capability information can be registered to the server without putting an excessive load on the IFAX 11A. Or, by setting capability obtaining time to a time zone where the operating ratio of the server is reduced, capability information can be registered to the server without putting an excessive load on the server.

Also, every time when the content of the destination information table 36 of IFAX 11A is updated, inquiry about the updated capability of the communication apparatus is made to DNS and capability information is obtained, thereafter the capability exchange table 50 of the server 13A may be updated.

(Fourth Embodiment)

The communication system according to a fourth embodiment is an example in which a server makes inquiry about capability information to a DNS server. The communication system according to the fourth embodiment has the same system structure as the communication system according to the aforementioned first to third embodiments excepting the function used when the server 13A obtains capability information.

Figure 17:
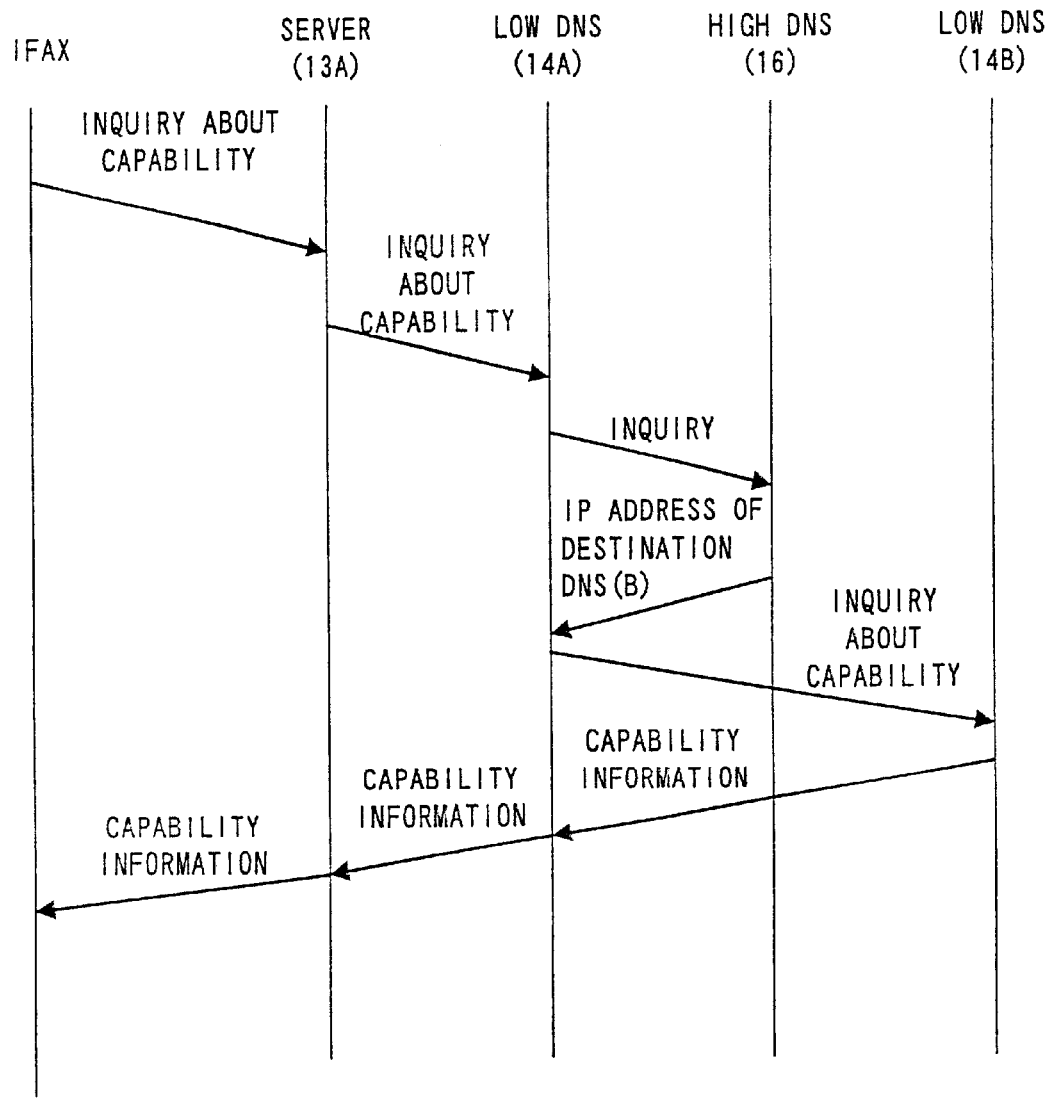
FIG. 17 is a sequence view for a capability exchange in a communication system according to a fourth embodiment of the present invention.

FIG. 17 shows a sequence view for obtaining capability information in the communication system according to this embodiment. IFAX 11A makes inquiry about capability information of a destination terminal (IFAX 11B) to the server 13A.

The server 13A, having the capability exchange table 50, makes inquiry about capability to the DNS server 14A, which manages the domain name of IFAX 11A when desired capability information is not registered in the capability exchange table 50. The inquiry about capability information is made using a command for requesting capability information and a mail address of a destination terminal. As a communication protocol between the server 13A and the DNS server 14A, an LDAP (Lightweight Directory Access Protocol) can be used. The inquiry about capability information is made using inquiry/search function supported by LDAP. In this case, a communication destination is an LDAP server.

The low DNS server 14A does not manage the domain name included in the mail address of the destination terminal. Then, the low DNS server 14A searches DNS for capability information in place of a client (server 13A). For this reason, the DNS server 14A forwards inquiry to the high DNS server 16 of the zone to which DNS server 14A belongs.

In this embodiment, the high DNS server 16 manages the domain of the DNS server 14B, which manages the domain name of the destination terminal. Therefore, the high DNS server 16 notifies the DNS server 14A of an IP address of the destination DNS server 14B.

The DNS server 14A gains access to the destination DNS server 14B using its IP address, and makes inquiry about capability of the destination terminal. As a result, the DNS server 14B extracts capability information of the destination terminal from the zone information table 60B of the DNS server 14B, and notifies the DNS server 14A of the extracted capability information. Then, the DNS server 14A forwards capability information of the destination terminal to the server 13A. Moreover, the server 13A notifies IFAX 11A of capability information. Also, the server 13A registers capability information obtained from DNS to the capability exchange table 50.

Thus, according to this embodiment, the server 13A obtains capability information from DNS and notifies IFAX 11A of capability information. For this reason, IFAX 11A makes inquiry about capability information to the server 13A only one time, thereby capability information can be surely obtained.

Also, the server 13A obtains capability information from DNS and registers it to the capability exchange table 50 of the server 13A. For this reason, a load put on IFAX 11A relating to an external registration of capability information can be reduced, and the need for mounting the external registration function on IFAX 11A can be eliminated.

(Fifth Embodiment)

This embodiment shows an example in which capability information of a part of the destination terminal is registered in IFAX. The communication system according to the fifth embodiment has the same system as the communication system according to the first embodiment.

Figure 18:
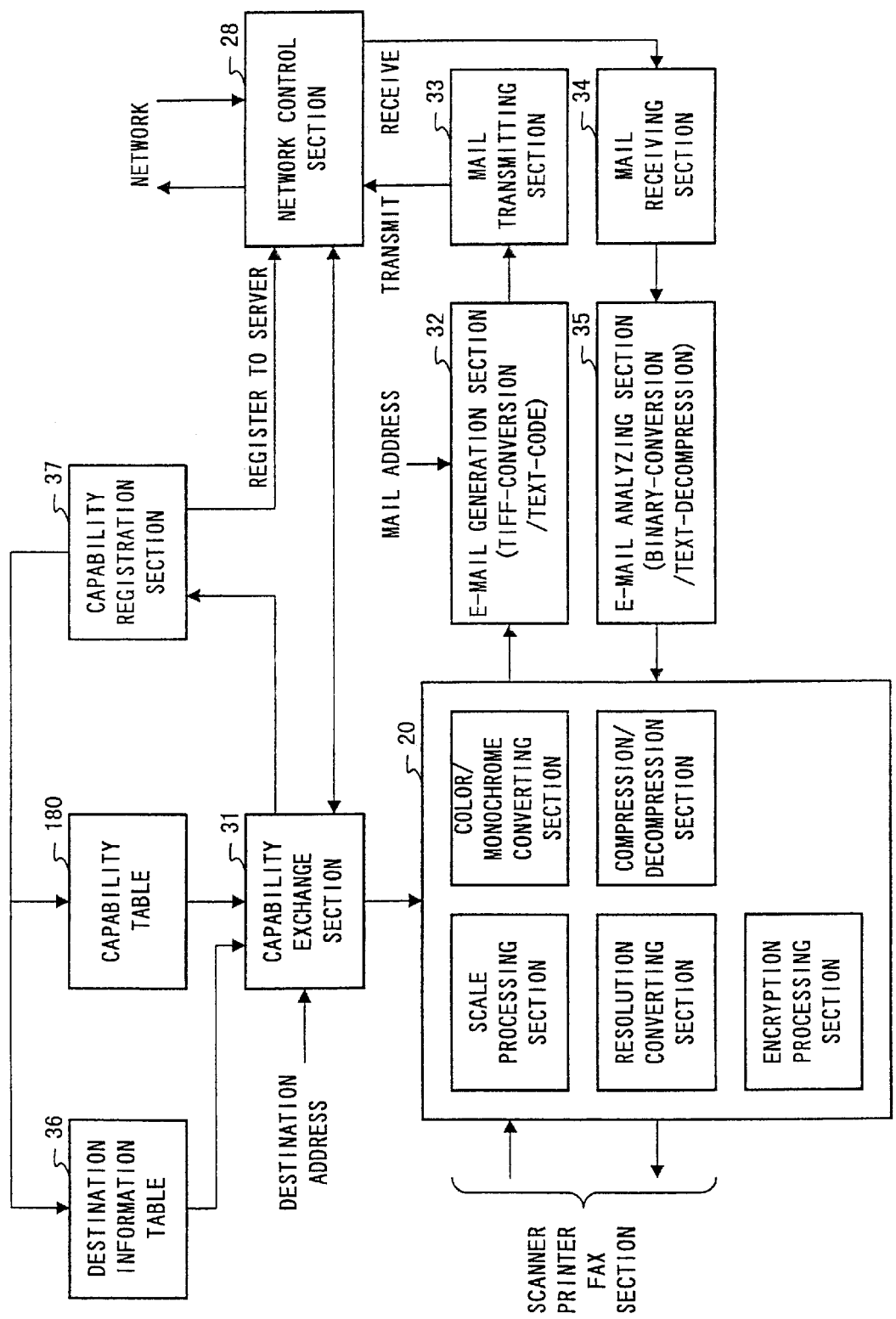
FIG. 18 is a functional block view in which a part of functions of IFAX according to a fifth embodiment of the present invention is extracted.

FIG. 18 shows a functional block view of IFAX 11A. IFAX 11A comprises a destination information table 36 in which a name of the kind of apparatus is registered for each network terminal to which destination information is registered. FIG. 19 shows the destination information table 36 to which the name of the kind of apparatus is registered. Also, a capability table 180 is prepared for each name of the kind of apparatus of the network terminal registered in the destination information table 36. FIG. 20 shows a content of data registered in the capability table 180. In the capability table 180, the name of the kind of apparatus and a mount capability are registered in a pair.

Each apparatus other than IFAX 11A has the same function as that of the aforementioned first embodiment, and the explanation will be omitted.

Figure 21:
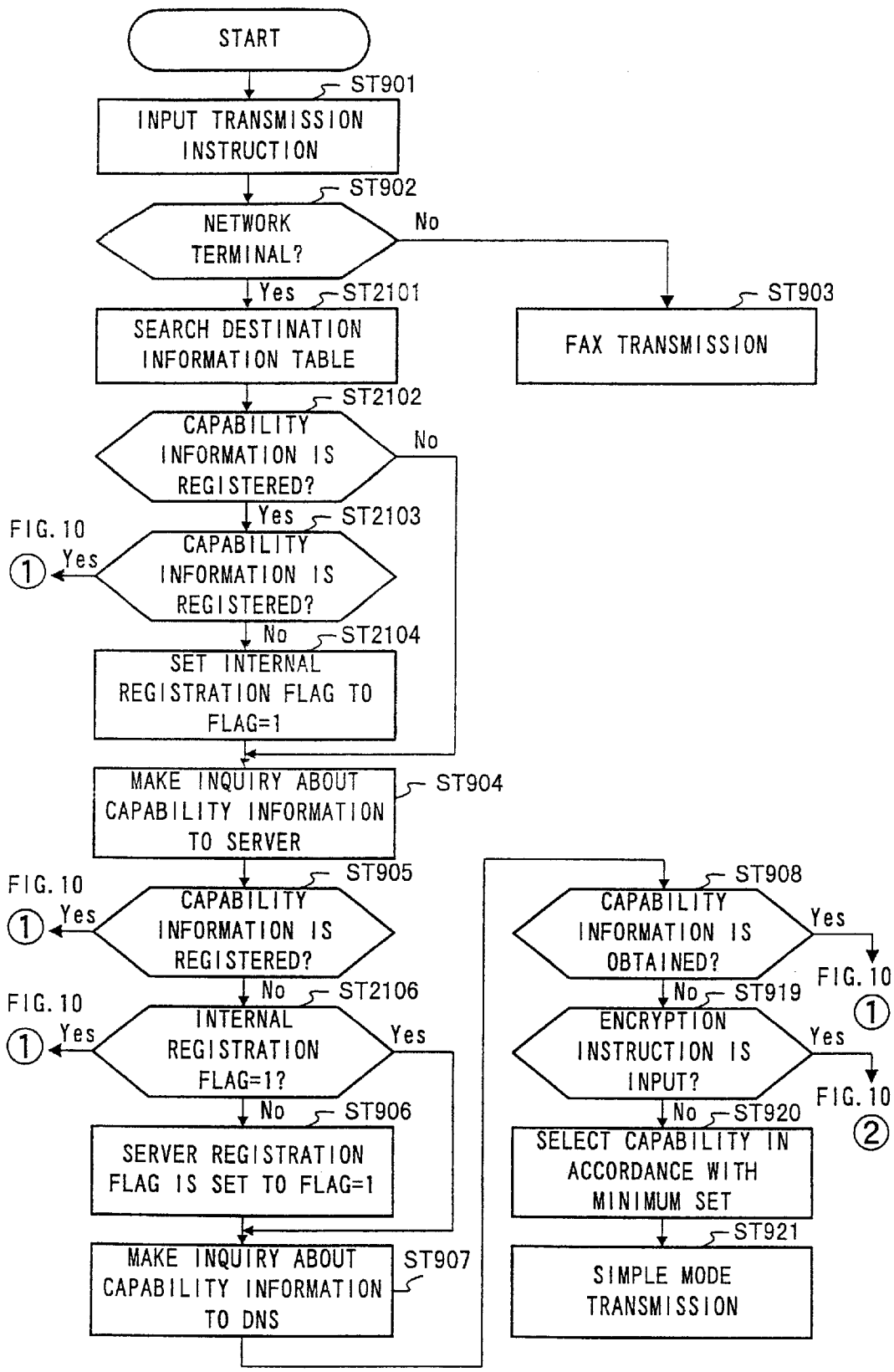
FIG. 21 is a flowchart showing the first half of operation for obtaining capability information according to the fifth embodiment of the present invention.

Next, the following will explain an operation for which the above-structured IFAX 11A obtains capability with reference to FIG. 21. Similar to the first embodiment, in step ST901, a destination input from the panel section 29 and a transmission instruction are detected. In step ST902, the capability exchange section 31 recognizes that the destination terminal is the network terminal when a mail address is input. In a case where a telephone number or an One-touch dialing key number is input, it is determined whether or not the destination terminal is the network terminal using the destination information table 36. If it is determined that the destination terminal is the G3 facsimile apparatus in step ST902, a facsimile transmission from the FAX section 26 to a telephone network is carried out (ST903).

If it is determined that the destination terminal is the network terminal in step ST902, the destination information table 36 is checked (ST2101), and it is determined whether or not the destination terminal subjected to transmission instruction is one that is already registered in the destination information table 36 (ST2102).

It should be noted that the registration of the destination terminal to the destination information table 36 is confirmed in step ST902 when the telephone number or the One-touch dialing key number is input. For this reason, processing in steps ST2101, ST2102 can be skipped.

When it is confirmed that destination information of the destination terminal is registered in step ST2102, whether or not capability information (name of the kind of apparatus) of the destination terminal is registered in the destination information table 36 is determined (ST2103). If capability information is registered in the destination information table 36, corresponding capability information is extracted from the capability table 180 having the name of the same kind of apparatus by use of the name of the kind of apparatus. Then, processing moves to step ST909 of FIG. 10, and a full mode transmission is prepared.

Thus, whether or not desired capability information is registered in an internal memory of IFAX 11A is first confirmed, and inquiry about capability information is made to the external server 13A or DNS only when no capability information is registered. For this reason, as compared with a system in which inquiry about capability information is made to the external server 13A or DNS without exception, capability information can be obtained with efficiency. In the case where capability information is registered in the internal memory of IFAX 11A, time required to obtain capability information can be reduced.

If it is confirmed that capability information of the destination terminal is not registered instep ST2103, an internal registration flag is set to flag=1 (ST2104). The case of flag=1 shows that capability information of the destination terminal to be obtained is not registered in the destination information table 36 of IFAX 11A and the capability table 180.

Figure 22:
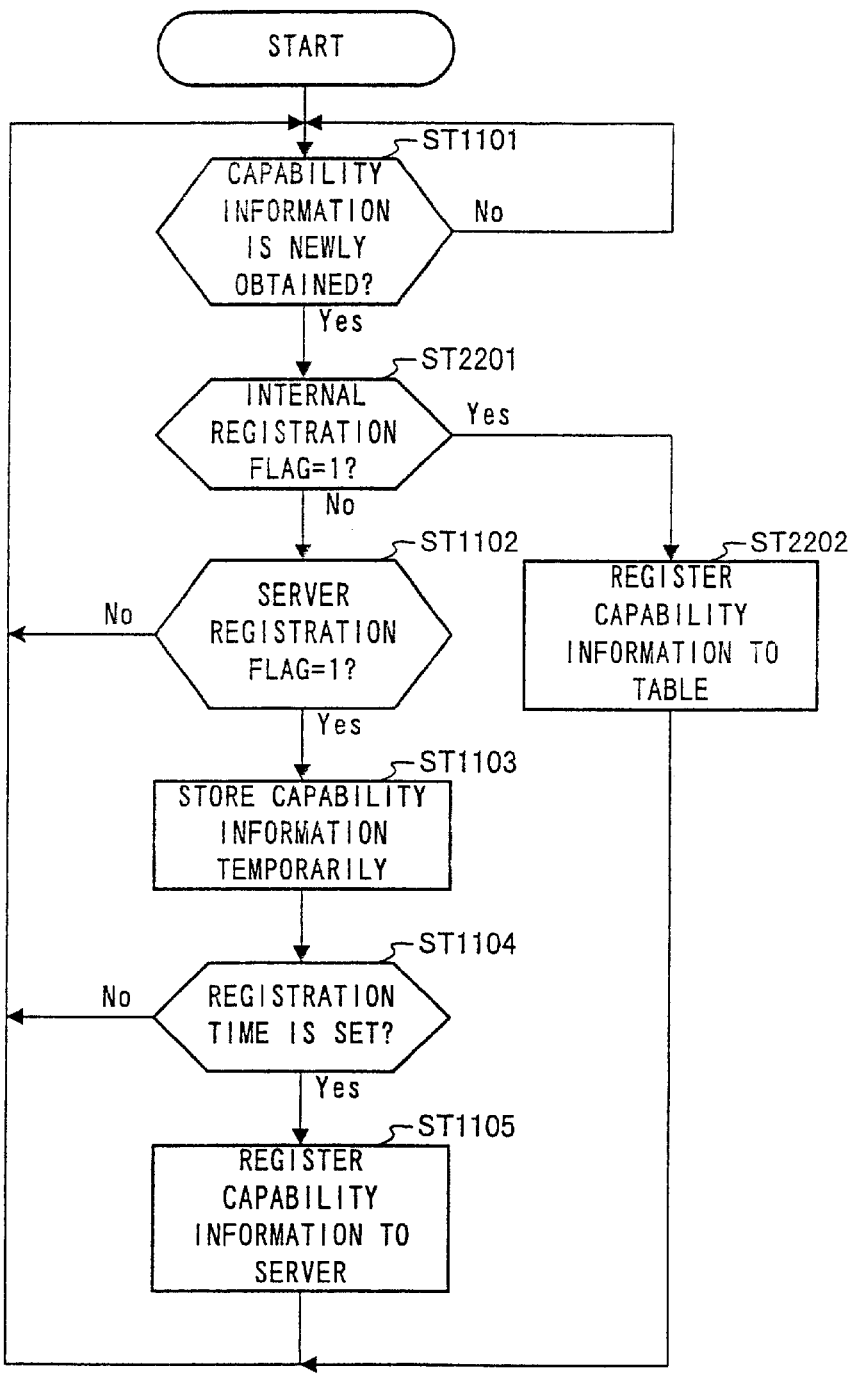
FIG. 22 is a flowchart showing operations for registering capability information according to the fifth embodiment of the present invention.

When inquiry about capability information of the destination terminal is made to the server 13A (ST904) and the result of inquiry shows that no capability information is registered in the server 13A (ST905), a server registration flag is set to flag=1 (ST906) if the internal registration flag cannot be set. If the internal registration flag is set to flag=1, processing moves to step ST907 without setting the server registration flag. The processing including and after step ST907 is already explained in FIGS. 9 and 10, and the explanation will be omitted. FIG. 22 shows a flowchart for which IFAX 11A registers newly obtained capability information. If IFAX 11A obtains new capability information by the aforementioned capability exchange (ST1101), the state of the internal registration flag is checked (ST2201). At this time, it is determined whether or not a capability table, which corresponds to a name of the kind of apparatus newly registered, exists in the destination information table 36 as a capability table 180. If no capability table exists, a capability table, which corresponds to a name of the kind of apparatus newly registered, is added and registered. The content of the capability table is included in capability information obtained by the capability exchange. The capability table of the same name of the kind of apparatus exists when the same name of the kind of apparatus is registered in the destination information table 36. It is unnecessary to register the capability table again.

Thereby, in connection with the network terminal registered in the destination information table 36 of IFAX 11A, the capability information is surely registered in the destination information cable 36 and the capability table 180. While, when the internal registration flag is not set in step ST2201, the state of the server registration flag is checked in step ST1102. When the server registration flag is not set, no registration processing is not carried out since capability information of the destination terminal is registered in the capability exchange table 50 of the server 13A. Conversely, if the server registration flag is set to flag=1, capability information is temporarily stored (ST1103), and capability information is registered in the server 13A (ST1105) when registration time comes (ST1104). Thereby, capability information of the network terminal, which has not been registered in the destination information table 36 of IFAX 11A and has been subjected to capability exchange previously, is automatically registered to the capability exchange table 50 of the server 13A. According to the embodiment of the present invention, there is a possibility that desired capability information will be registered in three sections, that is, the internal memory (180) of IFAX 11A, server 13A, DNS. Moreover, capability information may be registered to the WWW server 17 placed on the Internet, which is easily accessible from the network terminal on the other network. Thus, if a plurality of candidates for inquiry destination exists, it is possible to make inquiry about capability in order of precedence. For example, inquiry may be made in order of the candidate having the shortest access time. Or, inquiry may be made in order of the candidate having the highest possibility that capability information of the destination terminal will be stored. In this case, inquiry to DNS is finally made.

The above explained the case in which transmitting data was sent in accordance with the capability of the destination of terminal. However, if the capability of the destination terminal does not satisfy a predetermined condition, transmitting data may be registered to the WWW server 17 without being sent to the destination terminal directly. In this case, URL of the WWW server 17 is transmitted to the destination terminal by the e-mail. A user of the destination terminal uses the above URL sent from the network terminal on which capability higher than that of the destination terminal is mounted, and downloads transmitting data from the WWW server 17. As described above, according to the present invention, there are provided an image communication apparatus, a server apparatus, and a capability exchange method in which capability information of the destination terminal can be surely obtained on the terminal on the transmitter side and the Internet facsimile can execute capability exchange, which is equivalent to that of G3 facsimile apparatus. The present invention is not limited to the aforementioned embodiments. For example, according to the above-mentioned embodiments, the facsimile apparatus was explained as a communication terminal. However, the scope of the present invention includes the other image communication apparatus. For example, the present invention includes a PC to which a LAN card or a modem is connected in order to make connection with the the Internet. The scanner or the printer can be connected to the PC through an external section I/F. The present invention also includes a network scanner having a network communication interface, and a network copy machine. Moreover, the present invention includes an image combination machine comprising a scanner, a printer, a copy machine, a facsimile apparatus, etc.

Furthermore, the present invention includes a computer-readable storage medium having a program code causing a computer to execute the same processing as that of the facsimile apparatus according to the aforementioned embodiment.

The present invention is not limited to the above described embodiments, and various variations and modifications may be possible without departing from the scope of the present invention.

This application is based on the Japanese Patent Application No.HEI11-87214 filed on Mar. 29, 1999, entire content of which is expressly incorporated by reference herein.

What is claimed is:

1. A communication system comprising:
    a transmission apparatus configured to be connected to a first local area network;
    a reception apparatus configured to be connected to a second local area network, the second local area network being connected to the first local area network via Internet;
    a first server configured to be connected to the first local area network, the first server having a first table that stores capability information of a plurality of communication apparatuses, the capability information being associated with operational capabilities of the reception apparatus; and
    a second server configured to be connected to the second local area network, the second server having a second table that stores capability information of a plurality of communication apparatuses connected to the second local area network;
    wherein the transmission apparatus inquires of the first server to obtain the capability information of the reception apparatus from the first table when the transmission apparatus transmits image data to the reception apparatus via the Internet,
    wherein the first server inquires of the second server to obtain the capability information of the reception apparatus when the first table of the first server is determined to not store capability information of the reception apparatus;
    wherein when the second server obtains the capability information, the second server transmits the capability information obtained to the transmission apparatus; and
    wherein the transmission apparatus transmits the image data to the reception apparatus via the Internet, based on the capability information received.

2. The communication system according to claim 1, wherein the transmission apparatus inquires of the first server to obtain the capability information of the reception apparatus based on a telephone number of the reception apparatus.

3. The communication system according to claim 1, wherein the first server inquires of the second server to obtain the capability information of the reception apparatus based on a telephone number of the reception apparatus.

4. The communication system according to claim 2, wherein the first table comprises the telephone number, kind of apparatus corresponding to the telephone number, and the capability information corresponding to the kind of apparatus.

5. The communication system according to claim 1, wherein the capability information comprises at least one of resolution, and paper size, and compression format.

6. The communication system according to claim 3, wherein the second table comprises the telephone number, kind of apparatus corresponding to the telephone number, and the capability information corresponding to the kind of apparatus.

7. The communication system according to claim 1, further comprising a third server configured to be connected to the Internet, the third server receiving an inquiry about capability information of the reception apparatus from the first server, and sending an address of the second server back to the first server.

8. The communication system according to claim 1, further comprising a registration section that registers capability information of reception apparatuses into the first table of the first server.

9. The communication system according to claim 8, wherein the transmission apparatus includes the registration section, and the capability information is registered into the first table by transmission from the transmission apparatus to the first server.

10. The communication system according to claim 1, wherein the transmission apparatus is a personal computer.

11. The communication system according to claim 1, wherein the transmission apparatus is a facsimile apparatus communicable through the Internet.

12. The communication system according to claim 11, wherein the facsimile apparatus is connected to a public switched telephone network, and the facsimile apparatus is communicable with the reception apparatus via the public switched telephone network.

13. A method of communicating using the Internet, including a transmission apparatus configured to be connected to first local area network, a first server configured to be connected to the first local area network, the first server storing capability information of a plurality of communication apparatuses, a reception apparatus configured to be connected to second local area network, the second local area network being connected to the first local area network via Internet; a second server configured to be connected to the second local area network, the second server storing capability information of a plurality of communication apparatuses connected to the second local area network, said method comprising;
    transmitting a inquiry from the transmission apparatus to the first server regarding the capability information of the reception apparatus,
    transmitting a inquiry from the first server to the second server regarding the capability information of the reception apparatus when the inquiry from the transmission apparatus to the first server results in an indication that the first server does not have capability information of the reception apparatus;
    obtaining the capability information from the second server, and transmitting the obtained capability information to the transmission apparatus from the second server; and
    transmitting the image data to the reception apparatus from the transmission apparatus via the Internet, based on the capability information of the reception apparatus transmitted to the transmission apparatus.

14. An image communication apparatus comprising:
- a capability obtaining section, that, when an inquiry about capability of a destination is made to a first server, and the first server has no capability information of the destination, makes inquiry to an other server to obtain capability information of the destination;
- a data transmitting section that modifies image data to be suitable for the capability of the destination to enable transmission the image data to the destination via the Internet;
- an encryption processing section that encrypts the image data;
- an instructing section that instructs the image data to be encrypted; and
- a message transmitting section, that, when a destination can not execute encryption decoding and encryption is instructed, transmits a message to a predetermined manager terminal.

15. An image communication method, comprising:
- making, when an inquiry about capability of destination is made to a first server and the first server has no capability information of the destination, an inquiry to an other server to obtain capability information of the destination;
- modifying image data to be suitable for the capability of the destination to enable transmission of the image data to the destination via the Internet;
- providing encryption to the image data; and
- transmitting, when a destination can not execute encryption decoding and encryption is instructed, a message to a predetermined manager terminal.

* * * * *